(12) United States Patent
Han et al.

(10) Patent No.: US 11,921,278 B2
(45) Date of Patent: Mar. 5, 2024

(54) IMAGE STATUS DETERMINING METHOD AN APPARATUS, DEVICE, SYSTEM, AND COMPUTER STORAGE MEDIUM

(71) Applicant: Tencent Technology (Shenzhen) Company Limited, Shenzhen (CN)

(72) Inventors: Baochang Han, Shenzhen (CN); Xiao Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 345 days.

(21) Appl. No.: 17/373,416

(22) Filed: Jul. 12, 2021

(65) Prior Publication Data

US 2021/0341725 A1 Nov. 4, 2021

Related U.S. Application Data

(63) Continuation of application No. PCT/CN2020/090007, filed on May 13, 2020.

(30) Foreign Application Priority Data

May 29, 2019 (CN) .......................... 201910457380.4

(51) Int. Cl.
*G02B 21/36* (2006.01)
*G02B 21/00* (2006.01)
(Continued)

(52) U.S. Cl.
CPC .......... *G02B 21/367* (2013.01); *G02B 21/006* (2013.01); *G06F 18/22* (2023.01);
(Continued)

(58) Field of Classification Search
CPC ........ G02B 21/367; G06T 2207/10016; G06T 2207/10056; G06T 2207/30168;
(Continued)

(56) References Cited

U.S. PATENT DOCUMENTS

| 7,885,443 B2 | 2/2011 | Zingaretti et al. |
| 2003/0185450 A1* | 10/2003 | Garakani ............... G06V 20/40 |
| | | 382/232 |

(Continued)

FOREIGN PATENT DOCUMENTS

| CN | 101706609 A | 5/2010 |
| CN | 102314680 A | 1/2012 |

(Continued)

OTHER PUBLICATIONS

Tencent Technology, ISR, PCT/CN2020/090007, Jul. 29, 2020, 2 pgs.

(Continued)

*Primary Examiner* — Mainul Hasan
(74) *Attorney, Agent, or Firm* — Morgan, Lewis & Bockius LLP

(57) ABSTRACT

A method comprises obtaining a pathology image set using a microscope, the pathology image set including at least a to-be-evaluated image and one or more associated images, the associated images and the to-be-evaluated image are consecutive frame images acquired using the microscope. The method comprises determining a first status corresponding to the to-be-evaluated image according to the pathology image set, the first status being used for indicating a motion change of the to-be-evaluated image during the acquisition and the first status includes a plurality of predefined states. The method comprises in accordance with a determination that the first status corresponds to a static state of the plurality of predefined states, determining a second status corresponding to the to-be-evaluated image, the second status indicating a change in image clarity of the to-be-evaluated image. This application further discloses an image status determining apparatus, a device, and a computer storage medium.

19 Claims, 13 Drawing Sheets

(51) Int. Cl.
  *G06F 18/22*  (2023.01)
  *G06K 9/62*   (2022.01)
  *G06T 7/00*   (2017.01)
  *G06T 7/20*   (2017.01)
  *G06V 20/69*  (2022.01)

(52) U.S. Cl.
  CPC .............. *G06T 7/0002* (2013.01); *G06T 7/20* (2013.01); *G06V 20/69* (2022.01); *G06T 2207/10056* (2013.01)

(58) Field of Classification Search
  CPC ........... G06T 7/20; G06T 7/248; G06V 20/69; G06F 18/22
  See application file for complete search history.

(56) References Cited

U.S. PATENT DOCUMENTS

| | | | |
|---|---|---|---|
| 2006/0159367 A1* | 7/2006 | Zeineh | G02B 21/365 382/128 |
| 2009/0148153 A1 | 6/2009 | Minamide et al. | |
| 2016/0267656 A1* | 9/2016 | Van Leeuwen | G06T 7/0014 |
| 2016/0314585 A1* | 10/2016 | Thomas | G06V 40/10 |
| 2017/0345158 A1* | 11/2017 | Xu | G06T 7/38 |

FOREIGN PATENT DOCUMENTS

| | | | |
|---|---|---|---|
| CN | 104144345 A | 11/2014 | |
| CN | 104680483 A | 6/2015 | |
| CN | 105118088 A | 12/2015 | |
| CN | 106251358 A | 12/2016 | |
| CN | 107767365 A | 3/2018 | |
| CN | 108933897 A | 12/2018 | |
| CN | 109674494 A | 4/2019 | |
| CN | 110175995 A | 8/2019 | |
| CN | 110443794 A | 11/2019 | |
| EP | 2239612 A1 | 10/2010 | |
| WO | WO 2015/039575 A1 | 3/2015 | |
| WO | WO-2015039575 A1 * | 3/2015 | ........... H04N 19/527 |

OTHER PUBLICATIONS

Extended European Search Report, EP20814634.0, dated Jul. 15, 2022, 8 pgs.

Tencent Technology, WO, PCT/CN2020/090007, Jul. 29, 2020, 5 pgs.

Tencent Technology, IPRP, PCT/CN2020/090007, Nov. 16, 2021, 6 pgs.

* cited by examiner

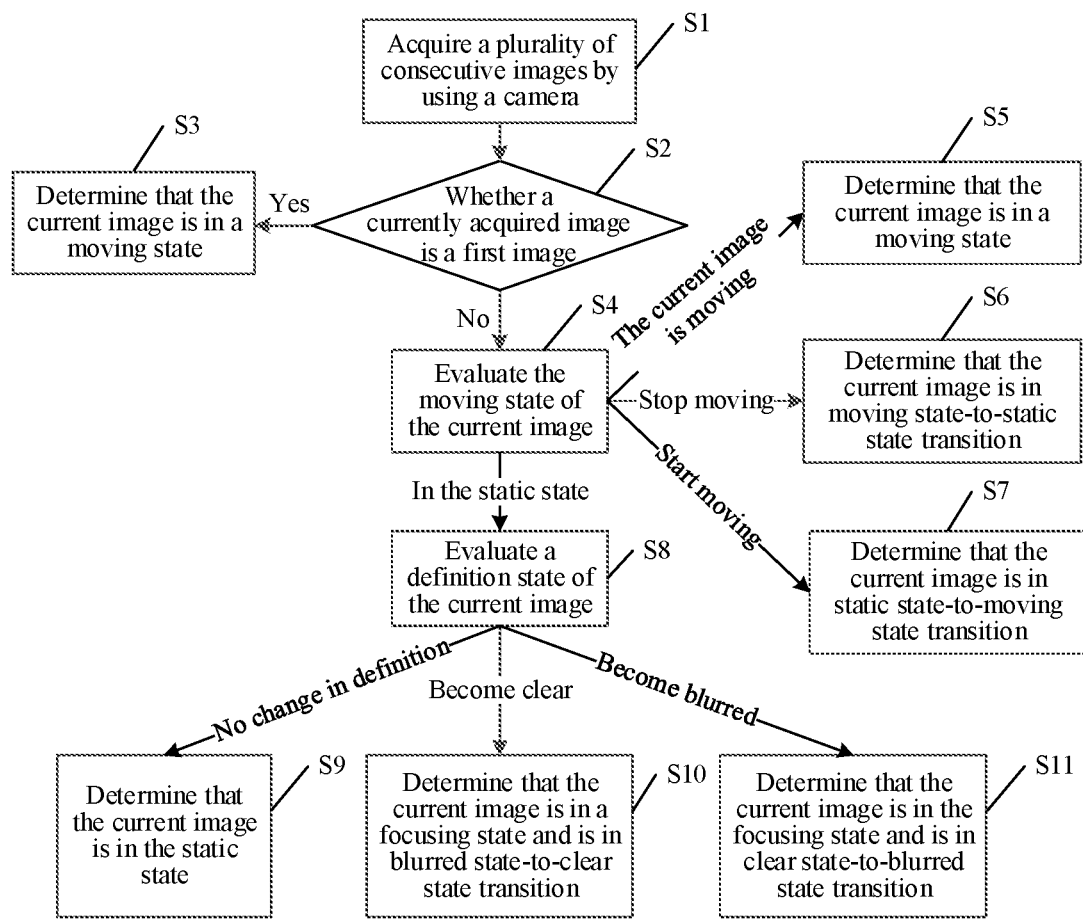

FIG. 2

Obtain a pathology image set, the pathology image set including at least a to-be-evaluated image and associated images, the associated images and the to-be-evaluated image being consecutive frame images — 101

Determine a first status corresponding to the to-be-evaluated image according to the pathology image set, the first status being used for indicating a motion change of the to-be-evaluated image — 102

Determine, in a case that the first status is a static state, a second status corresponding to the to-be-evaluated image according to the pathology image set, the second status being used for indicating an image clarity change of the to-be-evaluated image — 103

FIG. 3

IMAGE STATUS DETERMINING METHOD AN APPARATUS, DEVICE, SYSTEM, AND COMPUTER STORAGE MEDIUM

CROSS-REFERENCE TO RELATED APPLICATIONS

This application is a continuation application of PCT Patent Application No. PCT/CN2020/090007, entitled "IMAGE STATE DETERMINATION METHOD AND DEVICE, APPARATUS, SYSTEM, AND COMPUTER STORAGE MEDIUM" filed on May 13, 2020, which claims priority to Chinese Patent Application No. 201910457380.4, filed with the State Intellectual Property Office of the People's Republic of China on May 29, 2019, and entitled "IMAGE STATE DETERMINATION METHOD, DEVICE AND SYSTEM BASED ON PATHOLOGICAL IMAGE", all of which are incorporated herein by reference in their entirety.

FIELD OF THE TECHNOLOGY

This application relates to the field of artificial intelligence (AI), and in particular, to a pathology image-based image status determining method and apparatus, a device, a system, and a non-transitory computer-readable storage medium.

BACKGROUND OF THE DISCLOSURE

Pathological examination has been widely applied to clinical work and scientific research, and a main method for performing pathological diagnosis by a doctor is to observe a slice and observe cell morphology and tissue structure after enlarging the slice by 40 to 400 times, to make the diagnosis. A smart microscope and a digital pathology scanner are the most common tools used by the doctor.

The smart microscope usually has a camera and may consecutively acquire images for a field of view of the microscope. The acquired images are used for a plurality of microscope tasks such as an automatic image saving task and an image-based real-time artificial intelligence (AI) auxiliary diagnosis.

The camera of the smart microscope is generally a high-resolution high-speed industrial camera with a high frame rate of image acquisition (up to several frames to dozens of frames of images per second). Moreover, the images each have a large volume (a total number of pixels of a single image may be up to 4,000,000 or above), and a large amount of image data may be generated in a short time. If an image status can be evaluated, images acquired by the smart microscope can be screened based on the image status, so that the processing efficiency of a microscope task is improved. However, there is no solution for determining an image status in the related art.

SUMMARY

Embodiments of this application provide a pathology image-based image status determining method and apparatus, a device, a system, and a computer storage medium, which can perform moving state evaluation and image clarity evaluation on an acquired image, so that image screening may be performed based on a determined image status, to adapt to requirements of different microscope tasks, thereby improving the task processing efficiency.

In view of this, the embodiments of this application provide a pathology image-based image status determining method, including:

acquiring a pathology image set using a microscope, the pathology image set including at least a to-be-evaluated image and one or more associated images, the associated images and the to-be-evaluated image being consecutive frame images acquired using the microscope;

determining a first status corresponding to the to-be-evaluated image according to the pathology image set, the first status being used for indicating a motion change of the to-be-evaluated image during the acquisition and the first status includes a plurality of predefined states; and in accordance with a determination that the first status corresponds to a static state of the plurality of predefined states, determining a second status corresponding to the to-be-evaluated image according to the pathology image set, wherein the second status indicates a change in image clarity of the to-be-evaluated image.

The embodiments of this application further provide an image status determining apparatus, including:

an obtaining module, configured to obtain a pathology image set by using a microscope, the pathology image set including at least a to-be-evaluated image and associated images, the associated images and the to-be-evaluated image being consecutive frame images;

a determining module, configured to determine a first status corresponding to the to-be-evaluated image according to the pathology image set obtained by the obtaining module, the first status being used for indicating a motion change of the to-be-evaluated image; and the determining module, further configured to determine, when the first status is a static state, a second status corresponding to the to-be-evaluated image according to the pathology image set, the second status being used for indicating a change in image clarity of the to-be-evaluated image.

The embodiments of this application further provide a smart microscope system, including an image acquisition module, an image processing and analyzing module, a pathological analysis module, a storage module, and a transmission module, the image acquisition module being configured to obtain a pathology image set, the pathology image set including at least a to-be-evaluated image and associated images, the associated images and the to-be-evaluated image being consecutive frame images;

the image processing and analyzing module being configured to determine a first status corresponding to the to-be-evaluated image according to the pathology image set, the first status being used for indicating a motion change of the to-be-evaluated image; and determine, when the first status is a static state, a second status corresponding to the to-be-evaluated image according to the pathology image set, the second status being used for indicating a change in image clarity of the to-be-evaluated image;

the storage module being configured to store the to-be-evaluated image when the first status is of moving state-to-static state transition; and store the to-be-evaluated image when the second status is of blurred state-to-clear state transition;

the pathological analysis module being configured to perform pathological analysis on the to-be-evaluated image when the first status is of moving state-to-static state transition; and perform pathological analysis on the to-be-evaluated image when the second status is of blurred state-to-clear state transition; and the transmission module being configured to transmit the to-be-evaluated image when the first status is of moving state-to-static state transition, or the first status is of static state-to-moving state transition, or the first status is a moving state; and transmitting the to-be-evaluated image when the second status is of blurred state-to-clear state transition or the second status is of clear state-to-blurred state transition.

The embodiments of this application further provide a terminal device (e.g., a computer device, an electronic device, etc.), including a memory and a processor, the memory being configured to store a computer program; and the processor being configured to perform the pathology image-based image status determining method provided in the embodiments of this application when executing the computer program in the memory.

The embodiments of this application further provide a non-transitory computer readable storage medium, storing computer executable instructions, and the computer executable instructions being configured to perform the pathology image-based image status determining method provided in the embodiments of this application.

The application of the pathology image-based image status determining method and apparatus, the device, the system, and the non-transitory computer readable storage medium provided in the embodiments of this application has at least the following beneficial technical effects.

The embodiments of this application provide a pathology image-based image status determining method. First, a pathology image set is obtained, the pathology image set including at least a to-be-evaluated image and associated images, the associated image being a previous frame of image adjacent to the to-be-evaluated image, then a first status corresponding to the to-be-evaluated image is determined according to the pathology image set, the first status being used for indicating a motion change of the to-be-evaluated image, and a second status corresponding to the to-be-evaluated image is determined according to the pathology image set when the first status is a static state, the second status being used for indicating a change in image clarity of the to-be-evaluated image. In the foregoing manner, moving state evaluation and image clarity evaluation can be performed on acquired images, to determine image statuses of different images, and an image status of a pathology image often reflects an operation of a user on a microscope and a change in a field of view of an image in the microscope, so that pathology images acquired by using a camera of the microscope may be screened according to image statuses and a task type, to assist in completing a task purpose, thereby reducing the difficulty in image processing and improving the efficiency of task processing.

BRIEF DESCRIPTION OF THE DRAWINGS

FIG. 2 is a schematic flowchart of an image evaluation system according to an embodiment of this application.

FIG. 3 is a schematic flowchart of a pathology image-based image status determining method according to an embodiment of this application.

DESCRIPTION OF EMBODIMENTS

Figure 1:
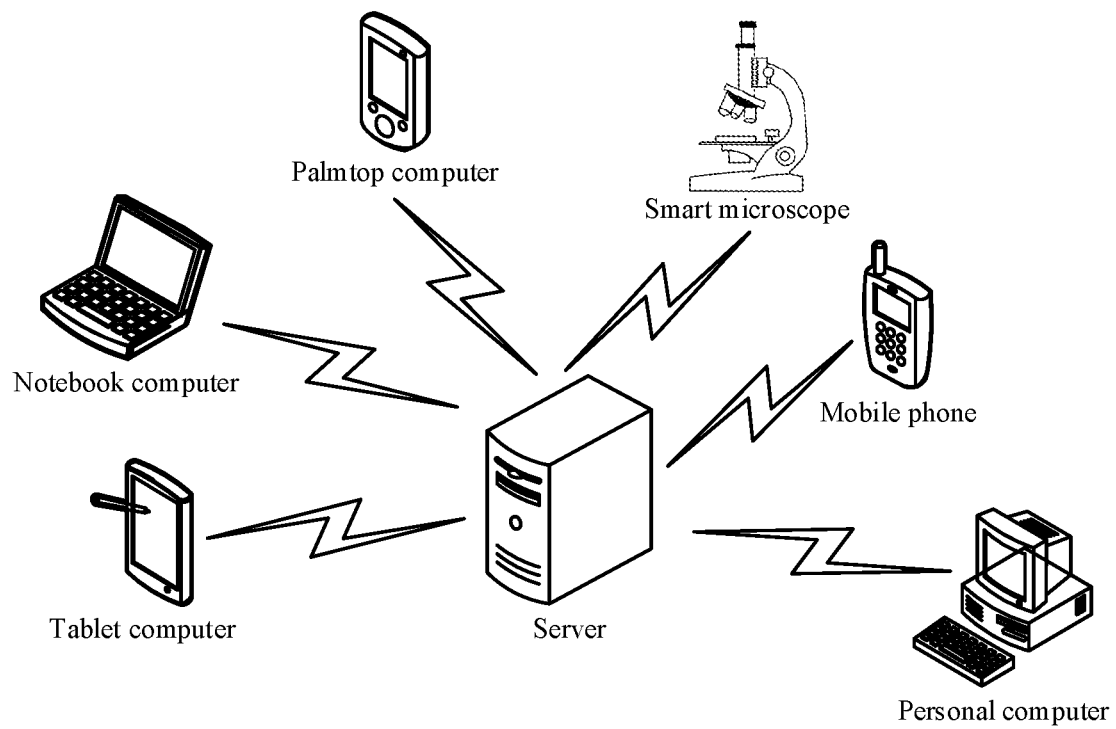
FIG. 1 is a schematic architectural diagram of an image evaluation system according to an embodiment of this application.

Embodiments of this application provide a pathology image-based image status determining method and apparatus, and a system, which can perform moving state evaluation and image clarity evaluation on acquired images, so that a reasonable operation may be performed on the images based on different image statuses, thereby reducing the difficulty in image processing and improving the efficiency of task processing.

In the specification of the embodiments of this application, claims, and accompanying drawings, the terms "first", "second", "third", "fourth", and the like (if existing) are intended to distinguish between similar objects, but do not necessarily indicate a specific order or sequence. It is to be understood that data used in this way is interchangeable in a suitable case, so that the embodiments of this application described herein can be implemented in a sequence in addition to the sequence shown or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that the pathology image-based image status determining method and the pathology image-based processing method provided in this application may be applicable to the field of artificial intelligence (AI) and may be applicable to the AI-based medical field, the field of video monitoring, or the like. For example, in the AI-based medical field, automatic focus is performed by using a microscope, a current field-of-view remains unchanged, images are continuously acquired by using a camera of the microscope, and a focusing button is automatically rotated according to a change of a clear state of the image, to implement automatic focus of the microscope. In another example, based on the field of video monitoring, a road transportation video may be monitored, and an image in a static state is automatically removed, thereby reducing the workload of subsequent video analysis.

With the rapid development of science and technologies, the application of AI in a medical industry is becoming increasingly extensive, and the most common medical images in the medical field include, but are not limited to, an angiography image, an angiocardiographic image, a computerized tomography (CT) image, a B-mode ultrasound image, and a pathology image. The pathology image is usually acquired by a smart microscope and includes an appearance image and a cell structure image of a biopsy tissue, and the like.

The main method for performing pathological diagnosis by a doctor is to observe a slice and observe cell morphology and tissue structure after enlarging the slice by 40 to 400 times, to make the diagnosis, and a smart microscope and a digital pathology scanner are the most common tools used by the doctor. The smart microscope breaks through a limitation of a conventional microscope and changes from being passively used to actively assisting the doctor, for example, assisting the doctor by using a computer vision, from simple but tedious cell metering to difficult and complex cancer type identification and accurate regional division. Meanwhile, smooth human-machine interaction between the doctor and the smart microscope is implemented through voice recognition. Finally, a final pathology report is generated with the assistance of a natural language processing technology. The doctor only needs to give a voice instruction during view of an image, and AI can automatically view the image, automatically acquire the image, and assist the doctor in diagnosing. The doctor gives a "generate a report" instruction after viewing the image, and the smart microscope can fill a report template with a microscope screenshot and a diagnosis result and automatically generate a report for the doctor to review the result and issue the report, so that a report generation step that is the most complex becomes fast and labor-saving. The smart microscope plays an important role in mitotic cell detection, immunohistochemical quantitative analysis, cancer region monitoring, and an auxiliary diagnosis process.

For ease of understanding, this application provides a pathology image-based image status determining method and a pathology image-based processing method, and both the methods may be applicable to an image evaluation system shown in FIG. 1. FIG. 1 is a schematic architectural diagram of an image evaluation system according to an embodiment of this application, and FIG. 2 is a schematic flowchart of an image evaluation system according to an embodiment of this application. Descriptions are provided below with reference to FIG. 1 and FIG. 2.

Step S1. Acquire a plurality of consecutive (e.g., continuous) images using a camera.

During actual implementation, an image may be acquired using a camera of a terminal or acquired using a camera that is independent of a terminal.

Step S2. Determine whether a current image is a first image, perform step S3 if the current image is the first image, and otherwise, perform step S4.

During actual implementation, a terminal device determines whether a current image is a first image, or a terminal device transmits an acquired image to a server, and the server determines whether the current image is a first image. If the current image is the first image, step S3 is performed, and if the current image is not the first image, step S4 is performed.

Step S3. Determine that the current image is in a moving state.

Step S4. Evaluate the movement state of the current image.

Step S5. Determine, if it is detected that the current image is moving, that the current image is in the moving state.

Step S6. Determine, if it is detected that the current image stops moving, that the state of the current image is in a transition state transitioning from the moving state to a static state.

Step S7. Determine, if it is detected that the current image starts moving, that the state of the current image is in a transition state transitioning from the static state to the moving state.

Step S8. Evaluate an image clarity (e.g., whether the image is clear, in focus, out of focus, sharp, crisp, blurred etc.) state of the current image if it is detected that the current image is in the static state.

Step S9. Determine, if it is detected that image clarity (e.g., a degree of clarity, whether the image is clear, in focus, out of focus, sharp, crisp, blurred etc.) of the current image does not change, that the current image is in the static state.

Step S10. Determine, if it is detected that the current image becomes clear, that the state of the current image is in a focusing state and is transitioning from a blurred state to a clear state.

Step S11. Determine, if it is detected that the current image becomes blurred, that the state of the current image is in a focusing state and is transitioning from the clear state to the blurred state.

The terminal device includes, and is not limited to, a smart microscope, a tablet computer, a notebook computer, a palmtop computer, a mobile phone, a speech interaction device, and a personal computer (PC), and is not limited herein. The smart microscope is integrated with visual, voice, and natural language processing technologies of AI. A doctor easily enters a voice instruction, and AI can perform automatic recognition, detection, and quantitative calculation, generate a report, and display a detection result into an eyepiece of the doctor in real time, to remind the doctor in time without interruption of an image-viewing process, thereby improving the diagnosis efficiency and accuracy of the doctor.

The pathology image-based image status determining method according to the embodiments of this application is described below with reference to the foregoing descriptions. FIG. 3 is a flowchart of a pathology image-based image status determining method according to an embodiment of this application. Referring to FIG. 3, the method includes the following steps.

101. Obtain a pathology image set, the pathology image set including at least a to-be-evaluated image and associated images, the associated images and the to-be-evaluated image being consecutive frame images.

In an actual application, the terminal device (for example, a smart microscope) acquires a pathology image set using a camera, and an image status determining apparatus obtains the pathology image set. The pathology image set includes a plurality of consecutive (e.g., continuous) images, that is, there may be a plurality of frames of associated images, and the associated images may be several previous adjacent frames of images that are acquired before the to-be-evaluated image.

It may be understood that the image status determining apparatus may be deployed on the terminal device, for example, deployed on the smart microscope, or may be deployed on the server. This is not limited herein.

102. Determine a first status corresponding to the to-be-evaluated image according to the pathology image set, the first status being used for indicating a motion change of the to-be-evaluated image.

In an actual application, the image status determining apparatus evaluates a moving state of the to-be-evaluated image, to obtain a first status, the first status being used for indicating a motion change of the to-be-evaluated image. It may be understood that at least three consecutive frames of images in the pathology image set are required to evaluate the moving state, that is, the associated images are two consecutive frames of images and form the three consecutive frames of images with the to-be-evaluated image. For example, the pathology image set includes the to-be-evaluated image, a previous frame of image of the to-be-evaluated image, and a frame of image prior to the previous frame of image of the to-be-evaluated image.

103. Determine, when the first status is a static state, a second status corresponding to the to-be-evaluated image according to the pathology image set, the second status being used for indicating a change in image clarity of the to-be-evaluated image.

In an actual application, if determining that the first status is a static state, the image status determining apparatus continues to evaluate an image clarity (e.g., a degree of clarity, whether the image is in focus, out of focus, blurred, sharp, crisp, etc.) of the to-be-evaluated image, to obtain a second status, the second status indicating a change in image clarity of the to-be-evaluated image. It may be understood that at least two consecutive frames of images in the pathology image set are required to evaluate the image clarity state, that is, the associated image is a previous frame of image of the to-be-evaluated image.

For ease of understanding, Table 1 shows the image states (e.g., image states, operation states of the microscope) and the descriptions corresponding to the image statuses based on microscope operations.

TABLE 1

| Image states (e.g., operation state) | Description |
|---|---|
| Static state | A doctor does not operate a microscope and a field of view of the microscope is in the static state |
| Moving state | The doctor is operating the microscope, for example, moving an object stage of the microscope, moving a slide, or switching magnifications, and the field of view of the microscope is in the moving state |
| Transition state (Moving state-to-static state transition) | The doctor stops operating the microscope, for example, stops moving the object stage of the microscope, stops moving the slide, or completes switching of the magnifications, and the field of view of the microscope is in transition from the moving state to the static state. |
| Transition state (Static state-to-moving state transition) | The doctor starts operating the microscope, for example, starts moving the object stage of the microscope, starts moving the slide, or starts switching the scopes, and the field of view of the microscope is in transition from the static state to the moving state |
| Focusing state (from blurred to clear) | The doctor is adjusting focus, and the field of view of the microscope is gradually becoming clear |
| Focusing state (from clear to blurred) | The doctor is adjusting the focus, and the field of view of the microscope is gradually becoming blurred |

In some embodiments, the six states described above can be categorized into a first status and a second status. The first status includes four types of image states, which are respectively a static state, a moving state, a first transition state from the moving state to the static state, and a second transition state from the static state to the moving state. The second status includes two types of states, namely a first focusing state from clear to blurred and a second focusing state (from blurred to clear). The six types of image states reflect an operation on the microscope by an operator (e.g., a doctor) and a change in a field of view of the microscope, so that the image is evaluated in real time.

By applying the embodiments of this application, moving state evaluation and image clarity evaluation can be performed on acquired images, to determine image states (e.g., status) of different images, and an image state often reflects a change in a field of view of an image caused by an operation of the user, and plays a very important role in different tasks, so that pathology images acquired by using a camera of the microscope may be screened according to the image state and a task type, to assist in completing a task purpose, thereby reducing the difficulty in image processing and improving the efficiency of task processing.

In some embodiments, the associated images include two consecutive frames of images, and the two consecutive frames of images are respectively a first associated image and a second associated image. Correspondingly, the first status corresponding to the to-be-evaluated image may be determined by the following method:

obtaining a similarity between the to-be-evaluated image and the first associated image, the first associated image pertaining to the pathology image set, and the first associated image being a previous image adjacent to the to-be-evaluated image;

obtaining a similarity between the first associated image and the second associated image when the similarity between the to-be-evaluated image and the first associated image is greater than a similarity threshold, the second associated image pertaining to the pathology image set, and the second associated image is a an image acquired prior to the first associated image;

determining, when the similarity between the first associated image and the second associated image is greater than the similarity threshold, that the first status is a static state; and determining, when the similarity between the first associated image and the second associated image is less than or equal to the similarity threshold, that the first status corresponds to a transition state from the moving state to the static state.

In some embodiments, when the associated images include a first associated image and a second associated image that are consecutive, the first status corresponding to the to-be-evaluated image may be determined according to the pathology image set by the following method:

obtaining a similarity between the to-be-evaluated image and the first associated image, the first associated image being a previous image adjacent to the to-be-evaluated image;

obtaining a similarity between the first associated image and the second associated image when the similarity between the to-be-evaluated image and the first associated image is less than or equal to a similarity threshold, the second associated image being a previous image adjacent to the first associated image;

determining, when the similarity between the first associated image and the second associated image is greater than the similarity threshold, that the first status (e.g., state) is of static state-to-moving state transition; and determining, when the similarity between the first associated image and the second associated image is less than or equal to the similarity threshold, that the first status is the moving state.

Figure 4:
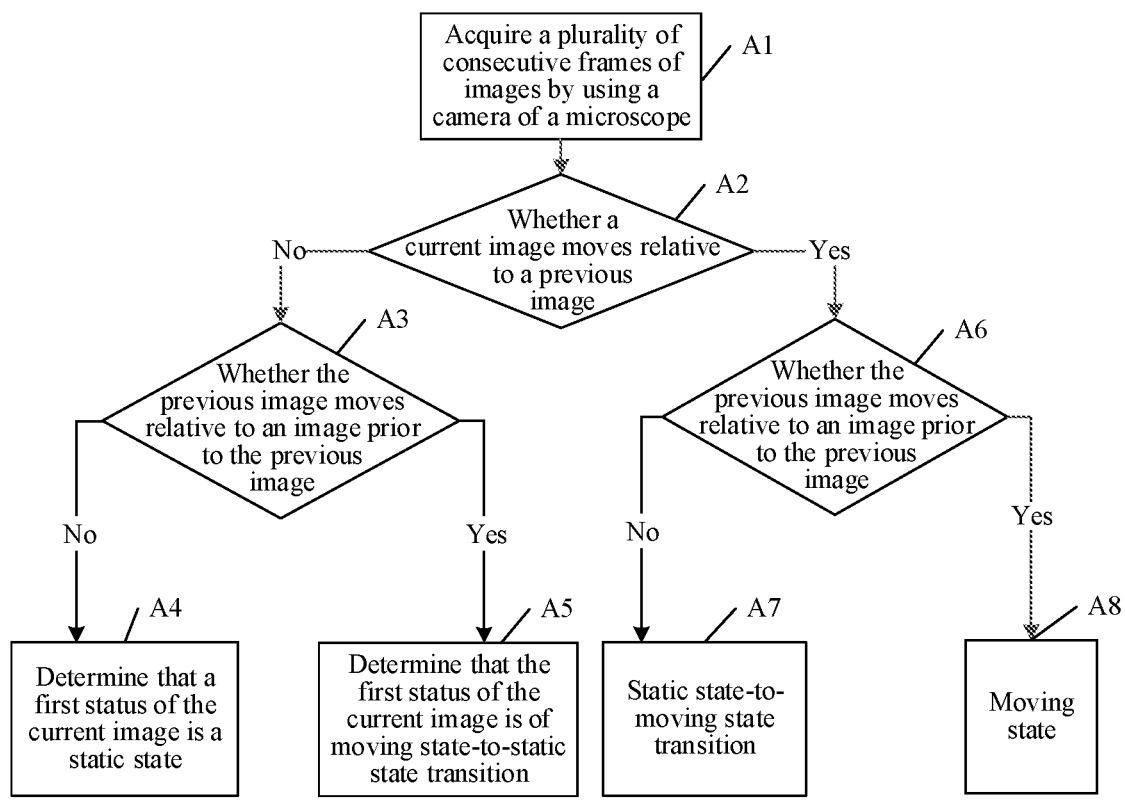
FIG. 4 is a schematic flowchart of motion evaluation on an image according to an embodiment of this application.

A method for determining the first status based on similarity calculation is described below. FIG. 4 is a schematic flowchart of motion evaluation on an image according to an embodiment of this application. Referring to FIG. 4, the method includes the following steps.

Step A1. Acquire a plurality of consecutive frames of images by using a camera of a microscope.

Step A2. Determine whether a current image (e.g., the to-be-evaluated image) moves relative to a previous image (e.g., the first associated image), perform step A6 if the current image moves, and perform step A3 if the current image does not move.

Herein, the determining method includes: obtaining a similarity between the to-be-evaluated image and the first associated image, and determining, when the similarity between the to-be-evaluated image and the first associated image is greater than a similarity threshold, that there is no motion between the to-be-evaluated image and the first associated image. In this case, step A3 is performed.

Step A3. Determine whether the previous image (that is, the first associated image) moves relative to an image prior to the previous image (that is, the second associated image), perform step A5 if the image prior to the previous image moves, and perform step A4 if the image prior to the previous image does not move.

Herein, the determining method includes: obtaining a similarity between the first associated image and the second associated image, and determining, when the similarity between the first associated image and the second associated image is greater than the similarity threshold, that there is no motion between the first associated image and the second associated image. In this case, step A4 is performed. When the similarity between the first associated image and the second associated image is less than or equal to the similarity threshold, it is determined that there is a motion between the first associated image and the second associated image. In this case, step A5 is performed.

Step A4. Determine that the first status of the current image (that is, the to-be-evaluated image) is a static state.

Step A5. Determine that the first status of the current image (that is, the to-be-evaluated image) is in a transition state (e.g., moving state-to-static state transition).

It may be understood that the similarity threshold may be set to 0.9, or may be set to another parameter, such as 0.8, 0.75, 0.7, etc., which is not limited this time.

Step A6. Determine whether the previous image (that is, the first associated image) moves relative to the image prior to the previous image (that is, the second associated image), perform step A8 if the image prior to the previous image moves, and perform step A7 if the image prior to the previous image does not move.

Step A7. Determine that the first status of the current image (that is, the to-be-evaluated image) is in static state-to-moving state transition.

Step A8. Determine that the first status of the current image (that is, the to-be-evaluated image) is the moving state.

In the foregoing manner, an association between two images can be evaluated based on a similarity, to provide a reasonable and reliable implementation for the solution.

In some embodiments, the similarity between the to-be-evaluated image and the first associated image may be obtained by the following method:

determining a source region pathology image set according to the to-be-evaluated image, the source region pathology image set including M source region images, M being an integer greater than 1;

determining a target region pathology image set according to the first associated image, the target region pathology image set including M target region images, and sizes of the target region images being less than sizes of the source region images;

extracting a first source region image from the source region pathology image set, and extracting a first target region image from the target region pathology image set;

extracting a second source region image from the source region pathology image set and extracting a second target region image from the target region pathology image set when both the first source region image and the first target region image are background images, and determining whether the second source region image and the second target region image are background images; and calculating a similarity between the first source region image and the first target region image when either the first source region image or the first target region image is not a background image, and using the calculated similarity as the similarity between the to-be-evaluated image and the first associated image.

Figure 5:
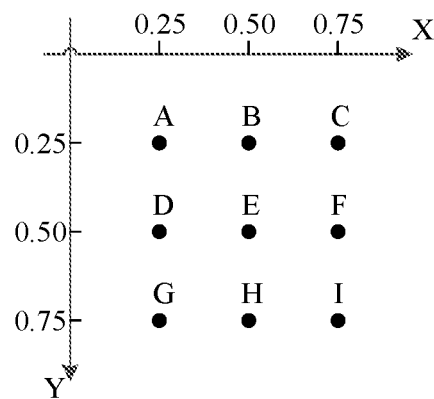
FIG. 5 is a schematic coordinate diagram of an image center of a source region image according to an embodiment of this application.

Herein, the method for obtaining a similarity between images is described. First, M source region images are selected from the to-be-evaluated image, and the M source region images form a source region pathology image set. FIG. 5 is a schematic coordinate diagram of an image center of a source region image according to an embodiment of this application. Referring to FIG. 5, it is assumed that nine source region images are selected from the to-be-evaluated image, coordinates of each source region image relative to the entire to-be-evaluated image are an image center E (0.50, 0.50), an image upper left A (0.25, 0.25), an image lower left G (0.25, 0.75), an image upper right C (0.75, 0.25), an image lower right I (0.75, 0.75), an image upper side B (0.50, 0.25), an image right side F (0.75, 0.50), an image lower side H (0.50, 0.75), and an image left side D (0.25, 0.50) in sequence, a size of each source region image being W*H.

Figure 6:
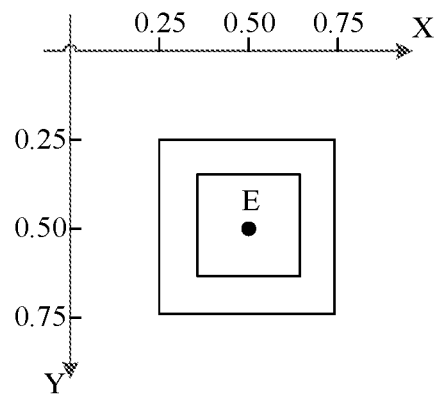
FIG. 6 is a schematic comparison diagram of a source region image and a target region image according to an embodiment of this application.

M target region images are selected from the first associated image, and the M target region images form a target region pathology image set. It is assumed that nine target region images are selected from the first associated image, coordinates of each target region image relative to the first associated image are an image center E (0.50, 0.50), an image upper left A (0.25, 0.25), an image lower left G (0.25, 0.75), an image upper right C (0.75, 0.25), an image lower right I (0.75, 0.75), an image upper side B (0.50, 0.25), an image right side F (0.75, 0.50), an image lower side H (0.50, 0.75), and an image left side D (0.25, 0.50) in sequence, a size of each target region image being w*h and meeting W>w and H>h. For example, W=H=96 and w=h=64 may be set. FIG. 6 is a schematic comparison diagram of a source region image and a target region image according to an embodiment of this application. As shown in figure, E is a center of the image, a big rectangle corresponds to a source region image, and a small rectangle corresponds to a target region image.

During actual implementation, it is assumed that M is nine, centers of nine region images need to be traversed. If i=0 is initially set, in an $i^{th}$ cycle a first source region image needs to be extracted from the to-be-evaluated image and a first target region image needs to be extracted from the first associated image according to sizes of the region images and $i^{th}$ center coordinates, for detecting. A detection method may include performing template matching on the first source region image by using a size of the first target region image as a size of a sliding window, and if it is detected that both the first source region image and the first target region image are background images, setting i=i+1 and starting a next round of traversal, to detect whether a second source region image and a second target region image are background images. Conversely, if the first source region image is not a background image, or the first target region image is not a background image, or both are not background images, a similarity between the two region images is calculated by using a template matching method. If the calculated similarity is greater than a similarity threshold, it is considered that there is no motion between the two consecutive frames of images, and if the calculated similarity is less than or equal to the similarity threshold, it is considered that there is a motion between the two consecutive frames of images, regardless of which case, the traversal is terminated.

If the M source region images and the M target region images are all background images, it is considered that the two frames of images are background images, and there is no relative motion therebetween.

In an actual application, a method for calculating a similarity between the first associated image and the second associated image is similar to the method for calculating the similarity between the to-be-evaluated image and the first associated image. Details are not described this time.

By applying the method for obtaining a similarity between images provided in the embodiments of this application, an image is divided into a plurality of regions, and similarity calculation is performed on the regions instead of on the entire image directly. In this way, on one hand, the accuracy of determining the similarity can be ensured as much as possible, and if all the regions are background images, the entire image very probably does not include useful information, and on the other hand, a size of the region is much less than a size of the entire image, even though the time complexity of the template matching method is relatively high, the evaluation can also be completed within a relatively short time.

In some embodiments, whether the second source region image and the second target region image are background images may be detected (e.g., determined) by the following method:

calculating a pixel value standard deviation of the second source region image;

determining, when the pixel value standard deviation of the second source region image is less than or equal to a standard deviation threshold, that the second source region image is a background image;

calculating a pixel value standard deviation of the second target region image; and determining, when the pixel value standard deviation of the second target region image is less than or equal to the standard deviation threshold, that the second target region image is a background image.

Herein, the method for determining a background image is described. If a source region image and a target region image are red green blue (RGB) images, the source region image and the target region image need to be first converted into grayscale images. A pixel value standard deviation of the target region image and a pixel value standard deviation of the source region image are calculated respectively based on the grayscale images. If the pixel value standard deviation is less than or equal to a given standard deviation threshold, the region image is a background image. A method for calculating the pixel value standard deviation is as follows:

$$\delta = \sqrt{\frac{1}{M \times N} \sum_{i=1}^{M} \sum_{j=1}^{N} (P(i,j) - \mu)^2} \ ;$$

where δ represents a pixel value standard deviation, M×N represents a size of a region image, P(i, j) represents a pixel value of an $i^{th}$ row and a $j^{th}$ column in the region image, and μ represents an average value.

By applying the method for detecting a background image provided in the embodiments of this application, a change of an image may be better represented by using a pixel value standard deviation, and a dispersion degree of each pixel in the image is truly reflected, thereby improving the detection accuracy.

In some embodiments, the similarity between the first source region image and the first target region image may be calculated by the following method:

obtaining an image matrix through calculation according to the first source region image and the first target region image, the image matrix including a plurality of elements; and determining the similarity between the first source region image and the first target region image according to the image matrix, the similarity between the first source region image and the first target region image being a maximum value of the elements in the image matrix.

Herein, the method for calculating a similarity between region images is described, and the first source region image and the first target region image are used as examples. In an actual application, the same processing manner may be used for each source region image and each target region image.

During actual implementation, for a source region image and a target region image, a size (w*h) of the target region image is less than a size (W*H) of the source region image, and the target region image needs to traverse the entire source region image in a sliding manner. Then, the entire source region image needs to be traversed in the sliding manner for (W−w+1) times in a horizontal direction and needs to be traversed in the sliding manner for (H−h+1) times in a vertical direction. Therefore, a result obtained through template matching is an image matrix with a size of (W−w+1)*(H−h+1), which is recorded as R, and the image matrix may be calculated by the following method:

$$R(x, y) = \frac{\sum_{x',y'} I'_2(x', y') \cdot I'_1(x+x', y+y')}{\sqrt{\sum_{x',y'} I'_2(x', y')^2 \cdot \sum_{x',y'} I'_1(x+x', y+y')^2}},$$

where $$I'_1(x+x', y+y') = I_1(x+x', y+y') - \frac{1}{w \cdot h}\sum_{x'',y''} I_1(x+x'', y+y'');$$

$$I'_2(x', y') = I_2(x', y') - \frac{1}{w \cdot h}\sum_{x'',y''} I_2(x'', y'');$$

where R(x, y) represents an element value of a matrix R at (x, y), $I_1$ represents a source region image, $I'_1$ represents a source region image after normalization processing, $I_2$ represents a target region image, $I'_2$ represents a target region image after the normalization processing, a value range of x is an integer greater than or equal to 0 and less than or equal to (W−w), a value range of y is an integer greater than or equal to 0 and less than or equal to (H−h), a value range of x' is an integer greater than or equal to 0 and less than or equal to w, a value range y' is an integer greater than or equal to 0 and less than or equal to h, only a region with a start point of (x, y) and a size of w*h in the target region image is operated, and the entire source region image is operated.

Value ranges of the elements in the image matrix are 0 to 1, a maximum value is selected as a similarity between two images, and a larger similarity indicates that the two images are more similar. It may be understood that the template matching algorithm adopted in this application is a normalized correlation coefficient matching algorithm (TM_CCO-EFF_NORMED). In an actual application, a square difference matching algorithm (CV_TM_SQDIFF), a normalized square difference matching algorithm (CV_TM_SQDIFF_NORMED), a correlation matching algorithm (CV_TM_CCORR), a normalized correlation matching algorithm (CV_TM_CCORR_NORMED), or a correlation coefficient matching algorithm (CV_TM_CCOEFF) may alternatively be adopted.

The template matching algorithm may effectively distinguish movement of the field of view of the microscope from jitter. The tremble of the ground or the table causes jitter of the field of view of the microscope, resulting in a slight offset of two consecutive images, but an offset caused by a man-made motion is usually quite large. Therefore, when the template matching method is used, W*H and w*h need to be properly set. It may be approximately considered that an offset that is less than (W−w)/2 in the horizontal direction and less than (H−h)/2 in the vertical direction is a jitter, and an offset that is greater than or equal to (W−w)/2 in the horizontal direction or greater than or equal to (H−h)/2 in the vertical direction is a motion.

In some embodiments, the second status corresponding to the to-be-evaluated image may be determined according to the pathology image set by the following method:

obtaining image clarity of the to-be-evaluated image and image clarity of the first associated image, the first associated image pertaining to the pathology image set, and the first associated image being a previous image adjacent to the to-be-evaluated image;

obtaining image clarity of a benchmark image when the image clarity of the to-be-evaluated image and the image clarity of the first associated image meet a first preset condition; and determining, when the image clarity of the benchmark image and the image clarity of the to-be-evaluated image meet a second preset condition, that the second status is a focusing state, the focusing state being in clear state-to-blurred state transition or blurred state-to-clear state transition.

Figure 7:
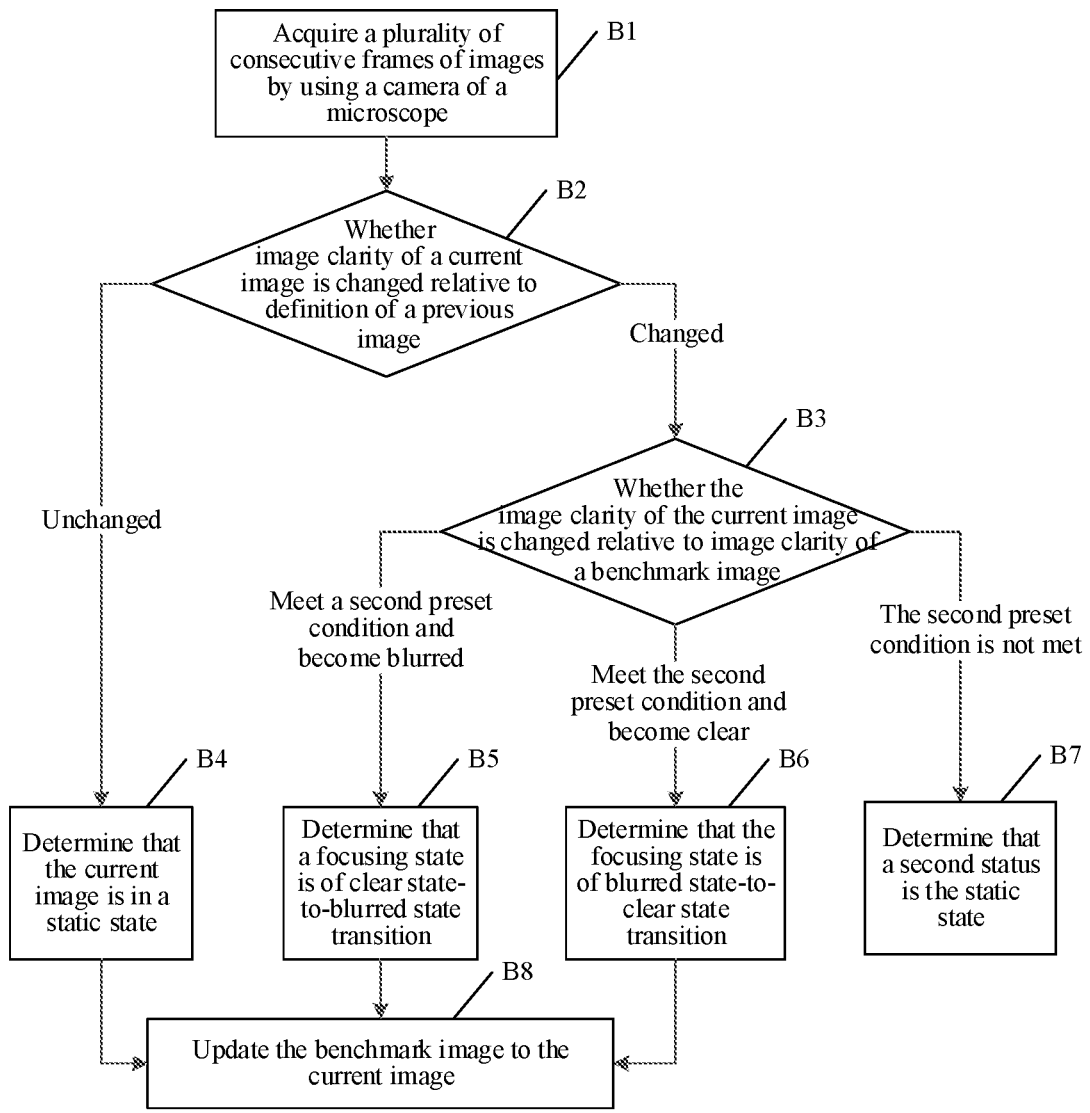
FIG. 7 is a schematic flowchart of a method for performing image clarity evaluation on an image according to an embodiment of this application.

Herein, the method for evaluating image clarity of an image (e.g., an image clarity, a degree of clarity of an image, whether an image is in focus, or blurred, etc.) is described. FIG. 7 is a schematic flowchart of a method for evaluating image clarity of an image according to an embodiment of this application. Referring to FIG. 7, the method includes the following steps.

Step B1. Acquire a plurality of consecutive frames of images by using a camera of a microscope.

Step B2. Determine whether image clarity of a current image (e.g., whether the image is clear, in focus, sharp, crisp, blurred, out of focus etc.) (that is, the to-be-evaluated image) is changed relative to image clarity of a previous image (that is, the first associated image), perform step B3 if the image clarity of the current image is changed, and perform step B4 if the image clarity of the current image is not changed.

Herein, the determining method includes: first, obtaining image clarity (e.g., whether the image is in focus, sharp, crisp, blurred, etc.) of the to-be-evaluated image and image clarity of the first associated image, then determining whether the image clarity of the to-be-evaluated image and the image clarity of the first associated image meet a first preset condition, and determining, when the image clarity of the to-be-evaluated image and the image clarity of the first associated image meet the first preset condition, that the image clarity of the to-be-evaluated image and the image clarity of the first associated image are changed. In this case, step B3 is performed. Conversely, when the image clarity of the to-be-evaluated image and the image clarity of the first associated image do not meet the first preset condition, it is determined that the image clarity of the to-be-evaluated image and the image clarity of the first associated image are not changed. In this case, step B4 is performed.

Step B3. Determine whether the image clarity (e.g., whether the image is clear, in focus, out of focus, blurred, sharp, crisp, etc.) of the current image (that is, the to-be-evaluated image) is changed relative to an image clarity of a benchmark image.

Herein, the determining method includes: first, obtaining image clarity (e.g., whether the image is clear, in focus, out of focus, blurred, sharp, crisp, etc.) of the benchmark image, then determining whether the image clarity of the benchmark image and the image clarity of the to-be-evaluated image meet a second preset condition, and determining that the second status is a focusing state when the image clarity of the benchmark image and the image clarity of the to-be-evaluated image meet the second preset condition. In this case, if the image becomes blurred, step B5 is performed, and it is determined that the focusing state is in clear state-to-blurred state transition. If the image becomes clear, step B6 is performed, and it is determined that the focusing state is in blurred state-to-clear state transition. If the image clarity of the benchmark image and the image clarity of the to-be-evaluated image do not meet the second preset condition, step B7 is performed, that is, it is determined that the second status is a static state.

Step B4. Determine that the current image (that is, the to-be-evaluated image) is in a static state.

Step B5. Determine that a focusing state is in clear state-to-blurred state transition.

Step B6. Determine that the focusing state is in blurred state-to-clear state transition.

Step B7. Determine that the second status is a static state.

Step B8 may be performed based on conditions of step B4, step B5, and step B6.

Step B8. Update the benchmark image to the current image (that is, the to-be-evaluated image).

By applying the method for evaluating image clarity of an image in real time provided in the embodiments of this application, a problem that the image clarity is sensitive to changes in external environments can be resolved by using a benchmark image and dual thresholds, so that whether focus of a device is being adjusted can be more reliably inferred.

In some embodiments, after the obtaining image clarity of the to-be-evaluated image and image clarity of the first associated image, the following operations may be further performed:

updating the benchmark image to the to-be-evaluated image when the image clarity of the to-be-evaluated image and the image clarity of the first associated image do not meet the first preset condition; and updating the image clarity of the benchmark image when the image clarity of the benchmark image and the image clarity of the to-be-evaluated image do not meet the second preset condition.

Correspondingly, after determining that the second status is a focusing state, the following operations may be further performed:

updating the benchmark image to the to-be-evaluated image.

In an actual application, the image clarity is relatively sensitive to the changes in the external environments, and movement of the device or self-adjustment (for example, automatic exposure or automatic white balance) of a camera results in a relatively large change in the image clarity. In this embodiment of this application, the problem may be resolved by the following method.

During actual implementation, a standard deviation of a Laplacian matrix of an image is used as image clarity. The Laplacian matrix describes contour information of the image. When the field of view of the microscope remains unchanged, a larger standard deviation of the Laplacian matrix indicates that a contour of the image is clearer and the image clarity of the image is larger. In addition to using the standard deviation of the Laplacian matrix as the image clarity, another index such as an average value or an information entropy of the Laplacian matrix may alternatively be adopted.

During image processing, a convolution operation may be performed on an image by using the following 3*3 template, to generate a Laplacian matrix of the image, and the template is:

$$\begin{bmatrix} 0 & 1 & 0 \\ 1 & -4 & 1 \\ 0 & 1 & 0 \end{bmatrix}.$$

The Laplacian matrix extracts edge information of the image. A clearer image indicates that an edge of the image is clearer, a value of an element in the Laplacian matrix fluctuates larger (a value of an element at a boundary is larger), and a standard deviation is larger.

After the image clarity of the to-be-evaluated image and the image clarity of the first associated image are obtained, the benchmark image is updated to the to-be-evaluated image if the image clarity of the to-be-evaluated image and the image clarity of the first associated image do not meet the first preset condition. The evaluation is performed by using the benchmark image and two consecutive images. When a difference between the image clarity of the to-be-evaluated image and the image clarity of the benchmark image is less than a given image clarity resolution threshold (e.g., image clarity threshold, e.g., a threshold value associated with whether the image is in focus, blurred, etc.) (that is, the image clarity of the benchmark image and the image clarity of the to-be-evaluated image do not meet the second preset condition), a possible case includes that the doctor does not adjust focus, the doctor adjusts the focus by an excessively small amplitude, the microscope jitters, the camera is self-adjusting, or the like. In this case, instead of updating the benchmark image, the image clarity of the benchmark image continues to be accumulated, to make a more accurate inference. An accumulation method is (image clarity)+a or (image clarity)+b, wherein a and b are positive numbers.

It may be understood that the first preset condition may be that a difference between the image clarity of the to-be-evaluated image and the image clarity of the first associated image is greater than or equal to the image clarity threshold, and the second preset condition may be that a difference between the image clarity of the benchmark image and the image clarity of the to-be-evaluated image is greater than or equal to the image clarity threshold.

By applying the dual-threshold detection manner provided in the embodiments of this application, the evaluation is performed by using a benchmark image and two consecutive images, and when a difference between the image clarity of a current image and the image clarity of the benchmark image is less than a given threshold, a possible case includes that the doctor does not adjust focus, the doctor adjusts the focus by an excessively small amplitude, the microscope jitters, the camera is self-adjusting, or the like. In this case, instead of updating the benchmark image, an image clarity difference of the benchmark image continues to be accumulated, which helps to obtain a more accurate detection result.

In some embodiments, after the obtaining image clarity of the to-be-evaluated image and image clarity of the first associated image, the method may further include the following operations:

determining whether a difference between the image clarity of the to-be-evaluated image and the image clarity of the first associated image is greater than or equal to a first image clarity threshold;

determining, when the difference between the image clarity of the to-be-evaluated image and the image clarity of the first associated image is greater than or equal to the first image clarity threshold, that the image clarity of the to-be-evaluated image and the image clarity of the first associated image meet the first preset condition;

determining, when the difference between the image clarity of the to-be-evaluated image and the image clarity of the first associated image is less than the first image clarity threshold, whether a difference between the image clarity of the benchmark image and the image clarity of the to-be-evaluated image is greater than or equal to a second image clarity threshold, the second image clarity threshold being greater than the first image clarity threshold; and determining, when the difference between the image clarity of the benchmark image and the image clarity of the to-be-evaluated image is greater than or equal to the second image clarity threshold, that the image clarity of the benchmark image and the image clarity of the to-be-evaluated image meet the second preset condition.

The embodiments of this application introduce dual thresholds, that is, introduce a first image clarity threshold and a second image clarity threshold. The first image clarity threshold is used when image clarity of a current image and image clarity of a previous image are compared, that is, it is determined whether a difference between the image clarity of the to-be-evaluated image and the image clarity of the first associated image is greater than or equal to the first image clarity threshold, and if the difference between the image clarity of the to-be-evaluated image and the image clarity of the first associated image is greater than or equal to the first image clarity threshold, it is determined that the image clarity of the to-be-evaluated image and the image clarity of the first associated image meet the first preset condition. Conversely, the image clarity of the to-be-evaluated image and the image clarity of the first associated image do not meet the first preset condition.

A high threshold is used when the image clarity of the current image and image clarity of a benchmark image are compared, that is, it is determined whether a difference between the image clarity of the to-be-evaluated image and the image clarity of the benchmark image is greater than or equal to the second image clarity threshold, and if the difference between the image clarity of the benchmark image and the image clarity of the to-be-evaluated image is greater than or equal to the second image clarity threshold, it is determined that the image clarity of the benchmark image and the image clarity of the to-be-evaluated image meet the second preset condition. Conversely, the image clarity of the benchmark image and the image clarity of the to-be-evaluated image do not meet the second preset condition.

Because the jitter changes the blur a lot, when the difference in the image clarity is greater than the first image clarity threshold, it cannot be inferred whether the doctor is adjusting the focus or the microscope jitters. Only when the difference in the image clarity is greater than the second image clarity threshold, it can be inferred that the doctor is adjusting the focus. Therefore, it is more reliable to use the low threshold to infer that the doctor does not adjust the focus of the microscope and to use the high threshold to infer that the doctor is adjusting the focus of the microscope.

The first image clarity threshold may be set to 0.02, the first image clarity threshold is a low threshold, the second image clarity threshold may be set to 0.1, and the second image clarity threshold is a high threshold. In an actual application, the first image clarity threshold and the second image clarity threshold may be further set to another parameter, which are not limited this time.

By applying the dual-threshold detection manner provided in the embodiments of this application, a low threshold is used when image clarity of a current image and image clarity of a previous image are compared, and a high threshold is used when the image clarity of the current image and image clarity of a benchmark image are compared. When the low threshold is used, it may be inferred that the doctor does not adjust focus of the microscope, and when the high threshold is used, it is inferred that the doctor is adjusting the focus of the microscope, thereby improving the reliability of image clarity detection.

Figure 8:
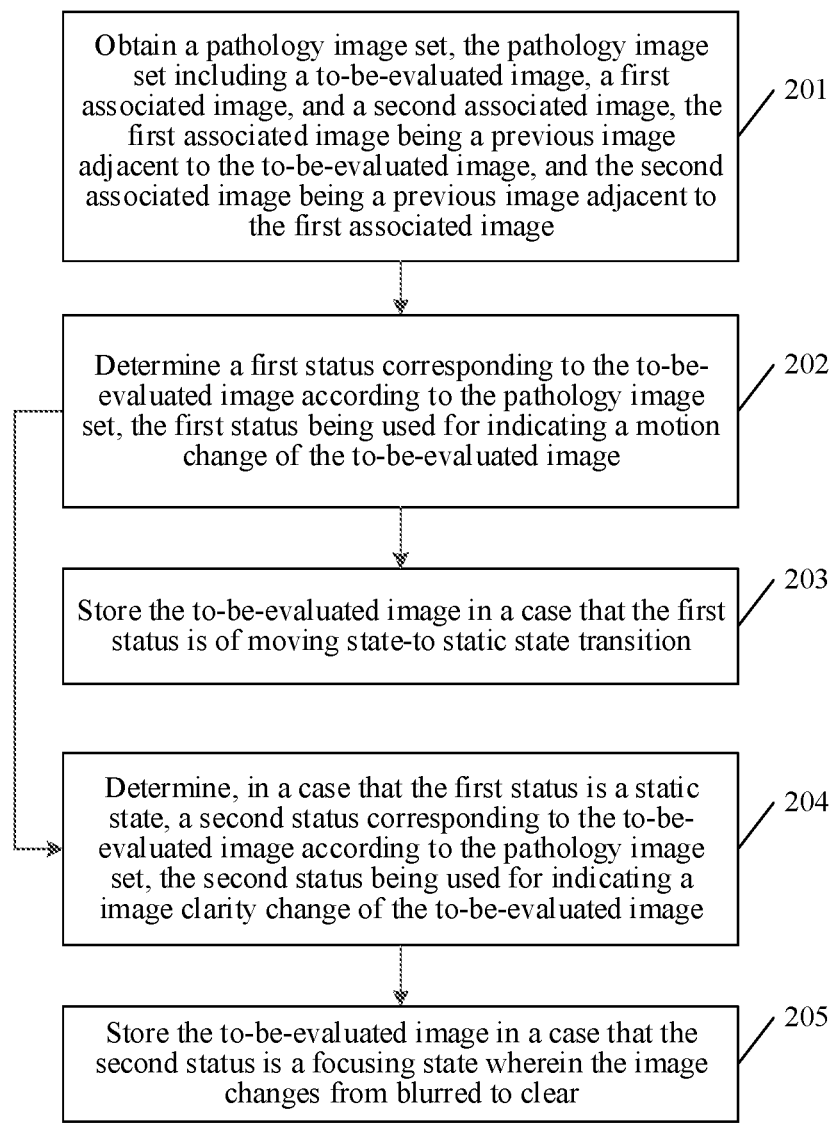
FIG. 8 is a schematic flowchart of a pathology image-based processing method according to an embodiment of this application.

The pathology image-based processing method according to the embodiments of this application is described below with reference to the foregoing descriptions. During actual implementation, the method may be independently implemented by a terminal (for example, a smart microscope) or a server, or may be implemented by a terminal and a server in cooperation, and an example in which the method is independently implemented by the terminal is used. FIG. 8 is a schematic flowchart of a pathology image-based processing method according to an embodiment of this application. Referring to FIG. 8, the method includes the following steps.

201. A terminal obtains a pathology image set, the pathology image set including a to-be-evaluated image, a first associated image, and a second associated image, the first associated image being a previous image adjacent to the to-be-evaluated image, and the second associated image being a previous image adjacent to the first associated image.

In an actual application, a smart microscope acquires a pathology image set by using a camera, to obtain the pathology image set. The pathology image set includes a plurality of consecutive pathology images, that is, includes at least one to-be-evaluated image and a plurality of associated images, and the associated images refer to several previous adjacent frames of images before the to-be-evaluated image.

It may be understood that the smart microscope may alternatively transmit the pathology image set to the server, and the server determines an image status corresponding to the to-be-evaluated image.

202. Determine a first status corresponding to the to-be-evaluated image according to the pathology image set, the first status being used for indicating a motion change of the to-be-evaluated image.

In an actual application, the smart microscope or the server evaluates a moving state of the to-be-evaluated image, to obtain a first status, the first status being used for indicating a motion change of the to-be-evaluated image. It may be understood that at least three frames of pathology images in the pathology image set are required to evaluate the moving state, that is, the to-be-evaluated image, a previous frame of pathology image of the to-be-evaluated image (that is, the first associated image), and a frame of pathology image prior to the previous frame of pathology frame of the to-be-evaluated image (that is, the second associated image) are included.

203. Store the to-be-evaluated image when the first status is of moving state-to-static state transition.

In an actual application, the to-be-evaluated image is stored when it is determined that the first status of the to-be-evaluated image is in moving state-to-static state transition.

204. Determine, when the first status is a static state, a second status corresponding to the to-be-evaluated image according to the pathology image set, the second status being used for indicating a change in image clarity of the to-be-evaluated image.

In an actual application, if it is determined that the first status of the to-be-evaluated image is the static state, an image clarity (e.g., whether the image is in focus, blurry, sharp, etc.) an image clarity (e.g., whether the image is in focus, blurry, sharp, etc.) of the to-be-evaluated image continues to be evaluated, to obtain a second status, the second status indicating a change in image clarity of the to-be-evaluated image. It may be understood that at least two frames of pathology images in the pathology image set are required to evaluate the image clarity state, that is, the to-be-evaluated image and a previous frame of pathology image of the to-be-evaluated image (that is, the first associated image) are included.

205. Store the to-be-evaluated image when the second status is of blurred state-to-clear state transition.

In an actual application, the to-be-evaluated image is stored when it is determined that the second status of the to-be-evaluated image is in blurred state-to-clear state transition.

Figure 9:
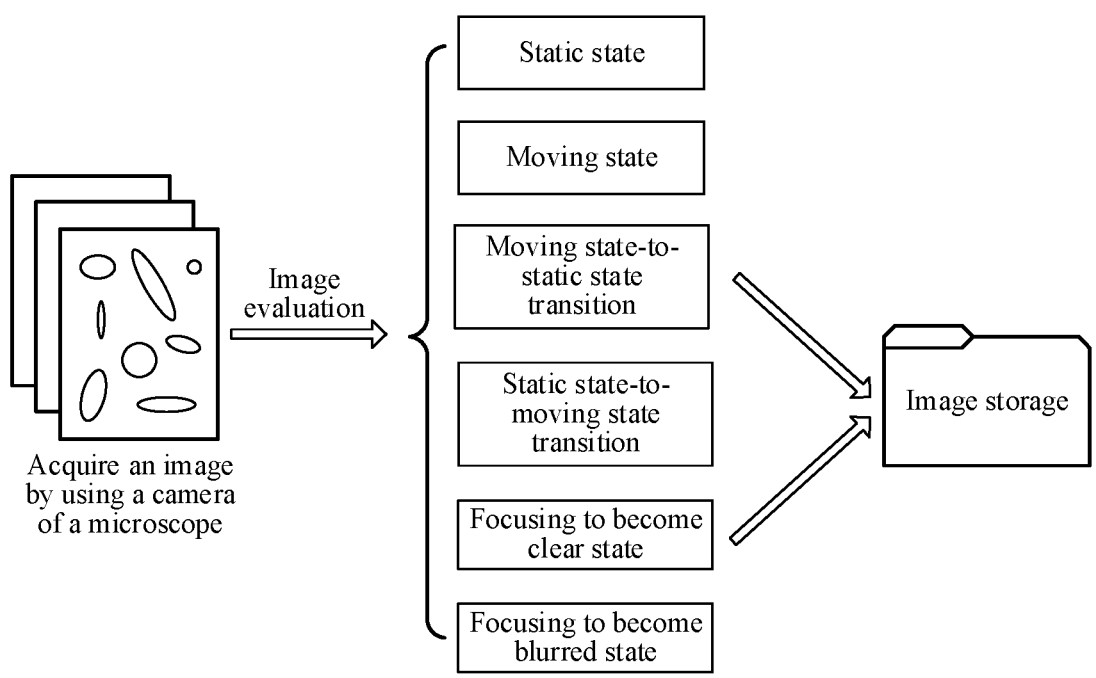
FIG. 9 is a schematic flowchart of a task of automatically storing an image according to an embodiment of this application.

FIG. 9 is a schematic flowchart of a method for a task of automatically storing an image according to an embodiment of this application. Referring to FIG. 9, a large quantity of pathology images are first acquired by using a camera of a smart microscope, then image statuses of the pathology images are evaluated, that is, a moving state and an image clarity (e.g., whether the image is in focus, blurry, sharp, etc.) an image clarity (e.g., whether the image is in focus, blurry, sharp, etc.) are evaluated, and pathology images in six types of image statuses may be obtained based on an evaluation result. The six types of image statuses include: a static state, a moving state, moving state-to-static state transition, static state-to-moving state transition, a focusing (clear state-to-blurred state transition) state, and a focusing (blurred state-to-clear state transition) state. In an actual application, only a pathology image in moving state-to-static state transition and a pathology image in the focusing (blurred state-to-clear state transition) state are stored, by which the pathology images are automatically stored.

With the application of the foregoing embodiments of this application, the pathology image acquired by the smart microscope may be automatically stored, and the pathology image is used for subsequent pathology report, communication, backup, and the like. Based on the task of automatically storing an image, a pathology image set is screened, and because an image in another state is redundant or of a low quality, only an image in moving state-to-static state transition and an image in blurred state-to-clear state transition need to be stored. In the foregoing manner, on one hand, there is no need for medical staff to manually acquire images, which improves the work efficiency, and on the other hand, a storage space occupied by the images is reduced.

Figure 10:
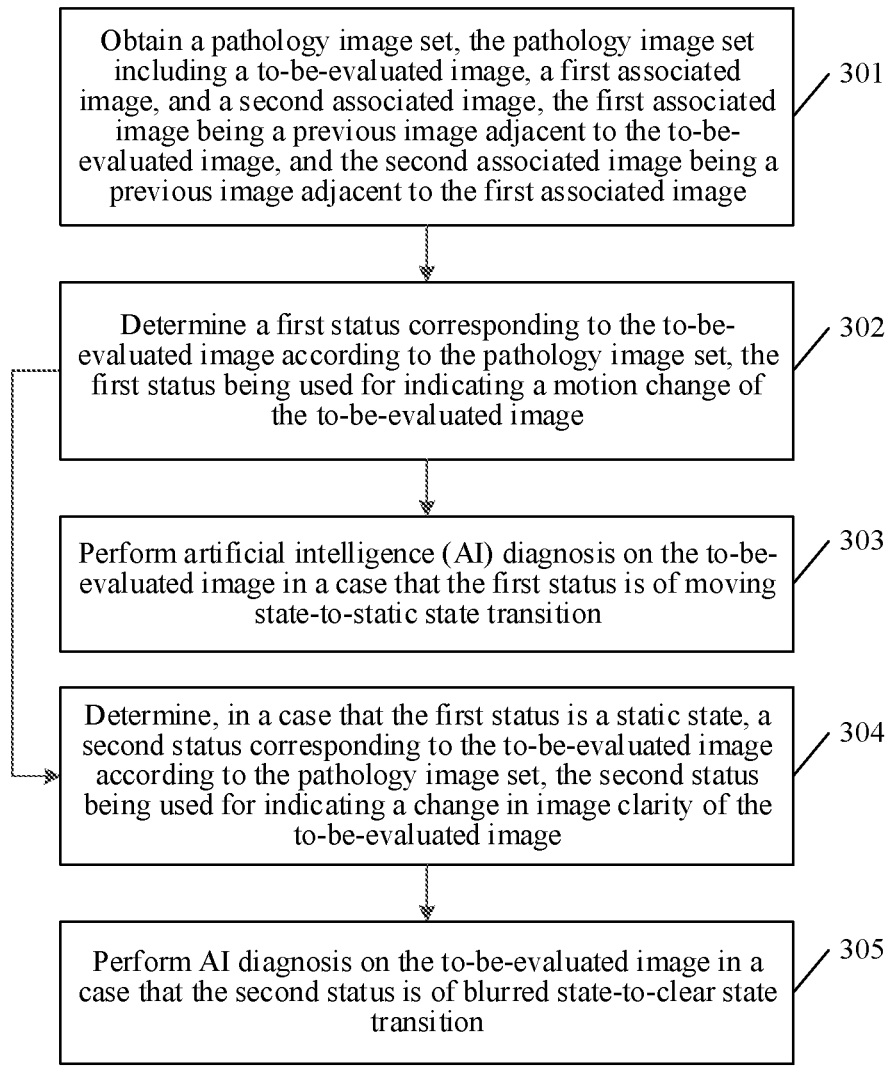
FIG. 10 is a schematic flowchart of a pathology image-based processing method according to an embodiment of this application.

The pathology image-based processing method according to the embodiments of this application is described below with reference to the foregoing descriptions. FIG. 10 is a schematic flowchart of a pathology image-based processing method according to an embodiment of this application. Referring to FIG. 10, the method includes the following steps.

301. Obtain a pathology image set, the pathology image set including a to-be-evaluated image, a first associated image, and a second associated image, the first associated image being a previous image adjacent to the to-be-evaluated image, and the second associated image being a previous image adjacent to the first associated image.

In an actual application, a smart microscope acquires a pathology image set by using a camera, to obtain the pathology image set. The pathology image set includes a plurality of consecutive pathology images, that is, includes at least one to-be-evaluated image and a plurality of associated images, and the associated images refer to several previous adjacent frames of images before the to-be-evaluated image. That is, the first associated image is a previous image adjacent to the to-be-evaluated image, and the second associated image is a previous image adjacent to the first associated image.

It may be understood that the smart microscope may alternatively transmit the pathology image set to the server, and the server determines an image status corresponding to the to-be-evaluated image.

302. Determine a first status corresponding to the to-be-evaluated image according to the pathology image set, the first status being used for indicating a motion change of the to-be-evaluated image.

In an actual application, the smart microscope or the server evaluates a moving state of the to-be-evaluated image, to obtain a first status, the first status being used for indicating a motion change of the to-be-evaluated image. It may be understood that at least three frames of pathology images in the pathology image set are required to evaluate the moving state, that is, the to-be-evaluated image, a previous frame of pathology image of the to-be-evaluated image (that is, the first associated image), and a frame of pathology image prior to the previous frame of pathology frame of the to-be-evaluated image (that is, the second associated image) are included.

303. Perform artificial intelligence (AI) diagnosis on the to-be-evaluated image when the first status is of moving state-to-static state transition.

In an actual application, AI auxiliary diagnosis is performed on the to-be-evaluated image when it is determined that the first status of the to-be-evaluated image is in moving state-to-static state transition.

A clinical decision support system is a support system configured to assist the doctor in making decision during diagnosis. The system analyzes data of a patient, to provide a diagnosis suggestion for the doctor, and then the doctor performs determining by combining the profession of the doctor, so that the diagnosis is faster and more accurate. The application of AI in the field of diagnosis is mainly aimed at problems that a growth rate of radiologists is lower than a growth speed of image data, allocation of medical talent resources is uneven, and a misdiagnosis rate is relatively high. AI may be used for analyzing case data and providing a diagnosis suggestion for the patient more reliably, thereby saving time for the doctor.

304. Determine, when the first status is a static state, a second status corresponding to the to-be-evaluated image according to the pathology image set, the second status being used for indicating a change in image clarity of the to-be-evaluated image.

In an actual application, if it is determined that the first status of the to-be-evaluated image is the static state, an image clarity (e.g., whether the image is in focus, blurry, sharp, etc.) an image clarity (e.g., whether the image is in focus, blurry, sharp, etc.) of the to-be-evaluated image continues to be evaluated, to obtain a second status, the second status indicating a change in image clarity of the to-be-evaluated image. It may be understood that at least two frames of pathology images in the pathology image set are required to evaluate the image clarity state, that is, the to-be-evaluated image and a previous frame of pathology image of the to-be-evaluated image (that is, the first associated image) are included.

305. Perform AI diagnosis on the to-be-evaluated image when the second status is of blurred state-to-clear state transition.

In an actual application, AI auxiliary diagnosis is performed on the to-be-evaluated image when it is determined that the second status of the to-be-evaluated image is in blurred state-to-clear state transition.

Figure 11:
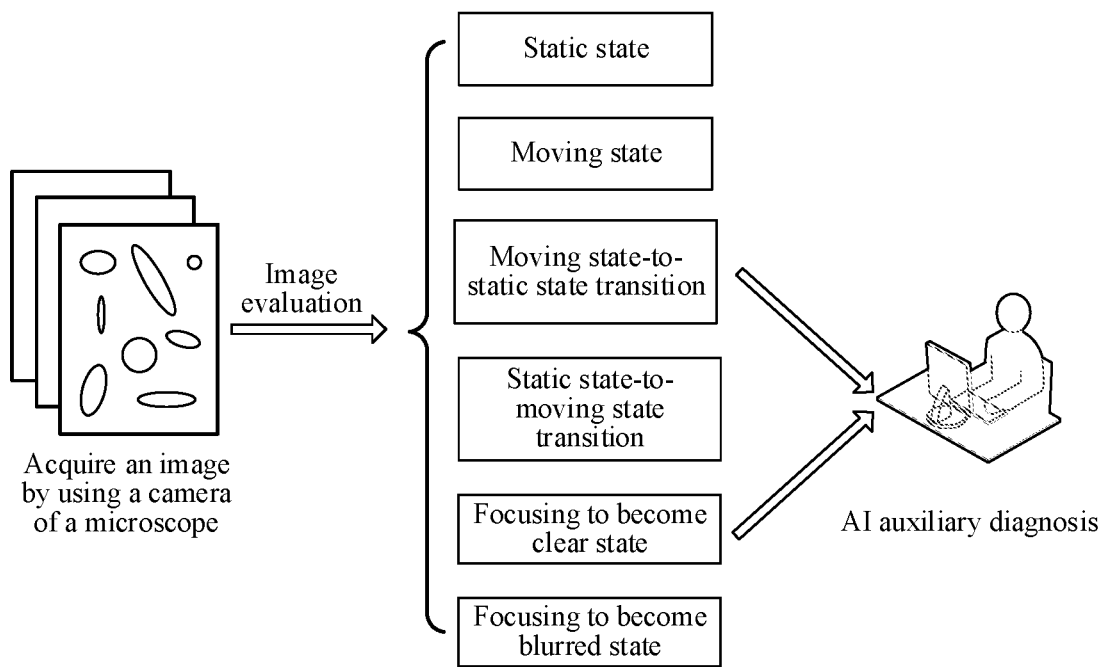
FIG. 11 is a schematic flowchart of a real-time artificial intelligence (AI) auxiliary diagnosis task according to an embodiment of this application.

For ease of description, FIG. 11 is a schematic flowchart of a real-time AI auxiliary diagnosis task according to an embodiment of this application. As shown in the figure, a large quantity of pathology images are first acquired by using a camera of a smart microscope, then image statuses of the pathology images are evaluated, that is, a moving state and an image clarity (e.g., whether the image is in focus, blurry, sharp, etc.) are evaluated, and pathology images in six types of image statuses may be obtained based on an evaluation result. The six types of image states include: a static state, a moving state, a first transition state (e.g., transition from moving state to static state), a second transition state (e.g., transition from static state to moving state), a first focusing state (e.g., from clear to blurred), and a second focusing state (e.g., from blurred to clear). In an actual application, AI auxiliary diagnosis is performed on only a pathology image in a transition state (e.g., transition from moving state to static state) and a pathology image in a focusing state (e.g., from blurred to clear).

Herein, real-time AI auxiliary diagnosis based on an image refers to transmitting images acquired by using the camera to an AI auxiliary diagnosis module in real time when the doctor uses a pathological microscope, and feeding back an AI auxiliary diagnosis result to the doctor, thereby improving the work efficiency of the doctor. In this embodiment of this application, the images transmitted to the AI auxiliary diagnosis module may be screened, and only an image in moving state-to-static state transition and an image in blurred state-to-clear state transition are selected. This is because the images in the two states are what the doctor needs to observe carefully and is really interested in, thereby greatly reducing a throughput pressure of the AI auxiliary diagnosis module.

Figure 12:
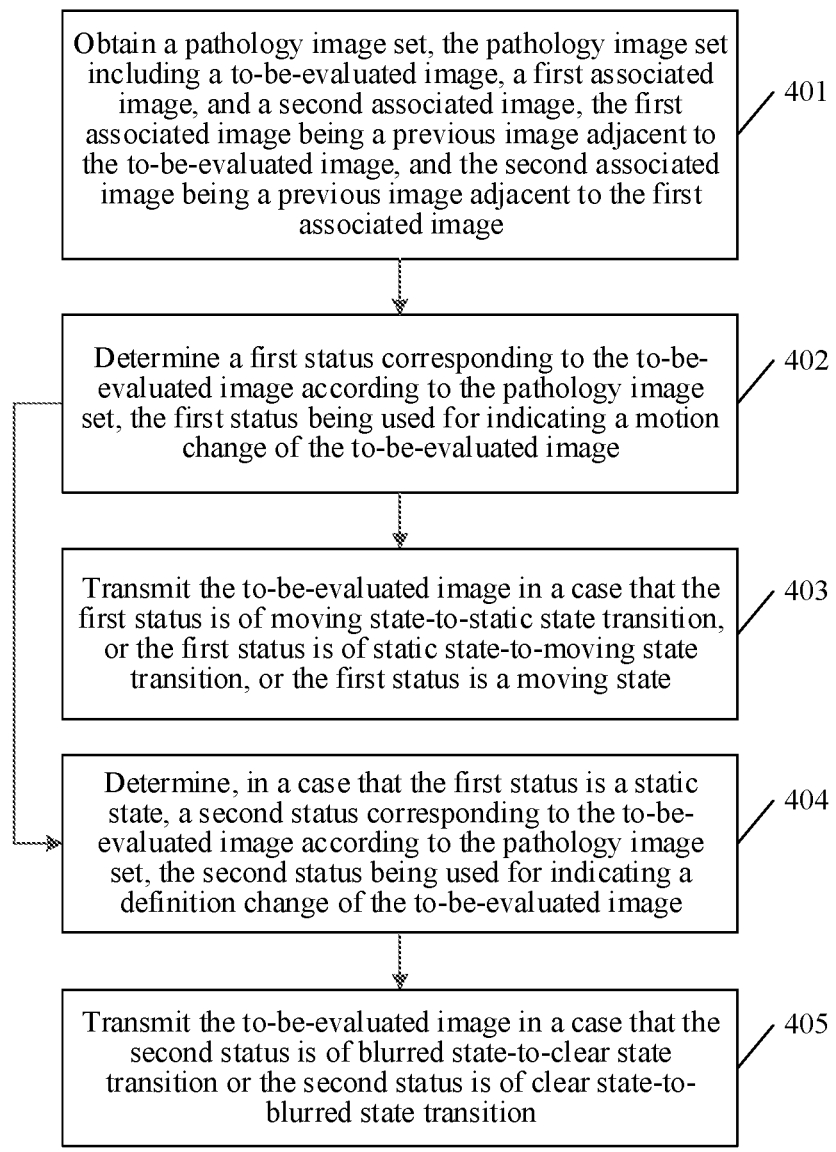
FIG. 12 is a schematic flowchart of a pathology image-based processing method according to an embodiment of this application.

The pathology image-based processing method according to the embodiments of this application continues to be described. FIG. 12 is a schematic flowchart of a pathology image-based processing method according to an embodiment of this application. Referring to FIG. 12, the method includes the following steps.

401. Obtain a pathology image set, the pathology image set including a to-be-evaluated image, a first associated image, and a second associated image, the first associated image being a previous image adjacent to the to-be-evaluated image, and the second associated image being a previous image adjacent to the first associated image.

In an actual application, a smart microscope acquires a pathology image set by using a camera, to obtain the pathology image set. The pathology image set includes a plurality of consecutive pathology images, that is, includes at least one to-be-evaluated image and a plurality of associated images, and the associated images refer to several previous adjacent frames of images before the to-be-evaluated image. That is, the first associated image is a previous image adjacent to the to-be-evaluated image, and the second associated image is a previous image adjacent to the first associated image.

It may be understood that the smart microscope may alternatively transmit the pathology image set to the server, and the server determines an image status corresponding to the to-be-evaluated image.

402. Determine a first status corresponding to the to-be-evaluated image according to the pathology image set, the first status being used for indicating a motion change of the to-be-evaluated image.

In an actual application, the smart microscope or the server evaluates a moving state of the to-be-evaluated image, to obtain a first status, the first status being used for indicating a motion change of the to-be-evaluated image. It may be understood that at least three frames of pathology images in the pathology image set are required to evaluate the moving state, that is, the to-be-evaluated image, a previous frame of pathology image of the to-be-evaluated image (that is, the first associated image), and a frame of pathology image prior to the previous frame of pathology image of the to-be-evaluated image (that is, the second associated image) are included.

403. Transmit the to-be-evaluated image when the first status is of moving state-to-static state transition, or the first status is of static state-to-moving state transition, or the first status is a moving state.

In an actual application, the to-be-evaluated image is transmitted when it is determined that the first status of the to-be-evaluated image is a non-static state (for example, in moving state-to-static state transition, in static state-to-moving state transition, or a moving state).

404. Determine, when the first status is a static state, a second status corresponding to the to-be-evaluated image according to the pathology image set, the second status being used for indicating a change in image clarity of the to-be-evaluated image.

In an actual application, if it is determined that the first status of the to-be-evaluated image is the static state, an image clarity (e.g., whether the image is in focus, blurry, sharp, etc.) of the to-be-evaluated image continues to be evaluated, to obtain a second status, the second status indicating a change in image clarity of the to-be-evaluated image. It may be understood that at least two frames of pathology images in the pathology image set are required to evaluate the image clarity state, that is, the to-be-evaluated image and a previous frame of pathology image of the to-be-evaluated image (that is, the first associated image) are included.

405. Transmit the to-be-evaluated image when the second status is of blurred state-to-clear state transition or the second status is of clear state-to-blurred state transition.

In an actual application, the to-be-evaluated image is transmitted when it is determined that the second status of the to-be-evaluated image is in blurred state-to-clear state transition or clear state-to-blurred state transition.

Figure 13:
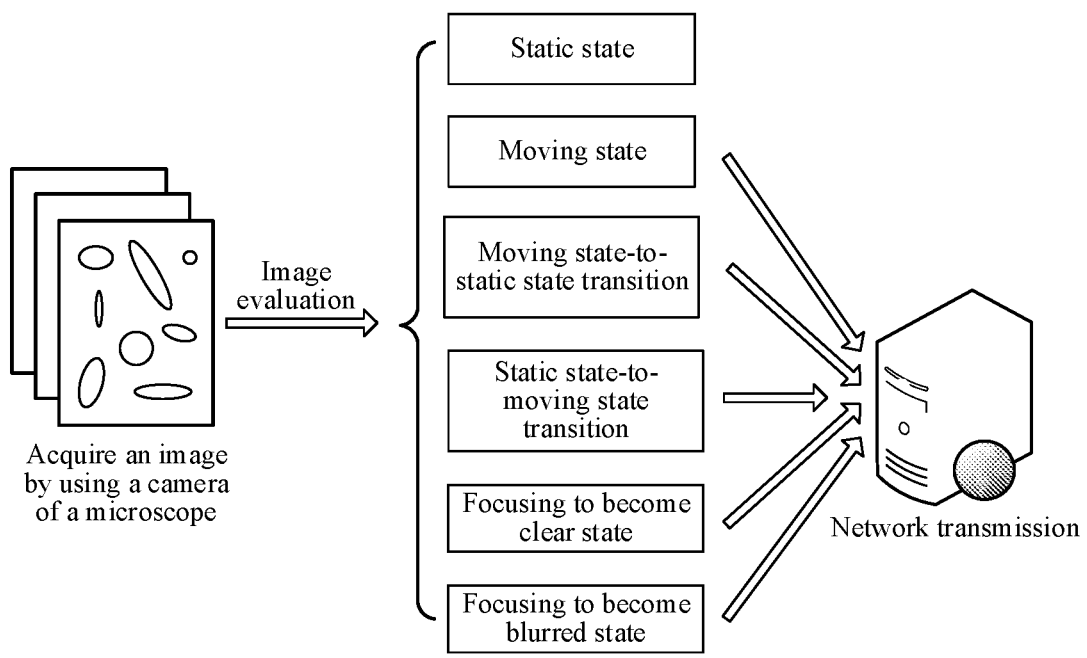
FIG. 13 is a schematic flowchart of a microscope field-of-view remote sharing task according to an embodiment of this application.

For ease of description, FIG. 13 is a schematic flowchart of a microscope field-of-view remote sharing task according to an embodiment of this application. As shown in the figure, a large quantity of pathology images are first acquired by using a camera of a smart microscope, then image statuses of the pathology images are evaluated, that is, a moving state and an image clarity (e.g., whether the image is in focus, blurry, sharp, etc.) are evaluated, and pathology images in six types of image statuses may be obtained based on an evaluation result. The six types of image statuses include: a static state, a moving state, moving state-to-static state transition, static state-to-moving state transition, a focusing (clear state-to-blurred state transition) state, and a focusing (blurred state-to-clear state transition) state. In an actual application, any pathology image in a non-static state may be transmitted.

In an actual application, during hospital consultation or communication, a doctor operating a microscope needs to remotely share a field of view of the microscope to other doctors for observing. In this case, pathology images continuously acquired by using a camera of the microscope need to be transmitted to the other party in real time over a network. In this way, the pathology images may be screened before being transmitted over the network, and a pathology image in a static state is excluded because the pathology image of this state is redundant, thereby reducing the amount of data required to be transmitted over the network.

Figure 14:
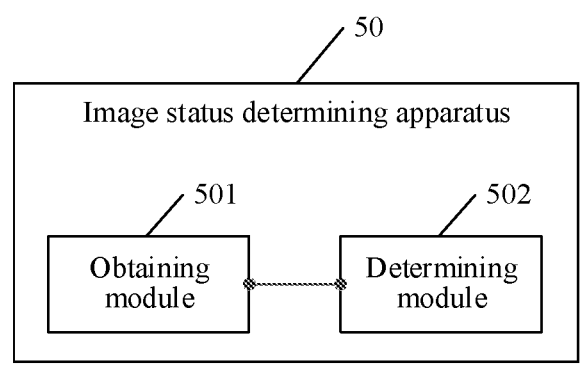
FIG. 14 is a schematic diagram of a composition structure of an image status determining apparatus according to an embodiment of this application.

The following describes an image status determining apparatus provided in the embodiments of this application in detail. FIG. 14 is a schematic diagram of a composition structure of an image status determining apparatus according to an embodiment of this application, and an image status determining apparatus 50 includes:

an obtaining module 501, configured to obtain a pathology image set, the pathology image set including at least a to-be-evaluated image and associated images, the associated images and the to-be-evaluated image being consecutive frame images;

a determining module 502, configured to determine a first status corresponding to the to-be-evaluated image according to the pathology image set obtained by the obtaining module 501, the first status being used for indicating a motion change of the to-be-evaluated image; and the determining module 502, further configured to determine, when the first status is a static state, a second status corresponding to the to-be-evaluated image according to the pathology image set, the second status being used for indicating a change in image clarity of the to-be-evaluated image.

In the foregoing manner, moving state evaluation and image clarity state evaluation can be performed on acquired images, to determine image statuses of different images, and an image status often reflects a change in a field of view of the image caused by an operation of a user, and plays a very important role in different tasks, so that a reasonable operation may be performed on the images based on different image statuses, thereby reducing the difficulty in image processing and improving the efficiency of task processing.

In some embodiments, the associated images include two consecutive frames of images, and the two consecutive frames of images are respectively a first associated image and a second associated image.

The determining module 502 is further configured to obtain a similarity between the to-be-evaluated image and the first associated image, the first associated image being a previous image adjacent to the to-be-evaluated image;

obtain a similarity between the first associated image and the second associated image when the similarity between the to-be-evaluated image and the first associated image is greater than a similarity threshold, the second associated image pertaining to the pathology image set, and the second associated image being a previous image adjacent to the first associated image;

determine, when the similarity between the first associated image and the second associated image is greater than the similarity threshold, that the first status is the static state; and determine, when the similarity between the first associated image and the second associated image is less than or equal to the similarity threshold, that the first status is of moving state-to-static state transition.

In the foregoing manner, an association between two images can be evaluated based on a similarity, to provide a reasonable and reliable implementation for the solution.

In some embodiments, the associated images include two consecutive frames of images, and the two consecutive frames of images are respectively a first associated image and a second associated image.

The determining module 502 is further configured to obtain a similarity between the to-be-evaluated image and the first associated image, the first associated image being a previous image adjacent to the to-be-evaluated image;

obtain a similarity between the first associated image and the second associated image when the similarity between the to-be-evaluated image and the first associated image is less than or equal to the similarity threshold, the second associated image pertaining to the pathology image set, and the second associated image being a previous image adjacent to the first associated image;

determine, when the similarity between the first associated image and the second associated image is greater than the similarity threshold, that the first status is of static state-to-moving state transition; and determine, when the similarity between the first associated image and the second associated image is less than or equal to the similarity threshold, that the first status is the moving state.

In the foregoing manner, an association between two images can be evaluated based on a similarity, to provide a reasonable and reliable implementation for the solution.

In some embodiments, the determining module 502 is further configured to determine a source region pathology image set according to the to-be-evaluated image, the source region pathology image set including M source region images, M being an integer greater than 1;

determine a target region pathology image set according to the first associated image, the target region pathology image set including M target region images, and sizes of the target region images being less than sizes of the source region images;

extract a first source region image from the source region pathology image set, and extract a first target region image from the target region pathology image set;

extract a second source region image from the source region pathology image set and extract a second target region image from the target region pathology image set when both the first source region image and the first target region image are background images, and detect whether the second source region image and the second target region image are background images; and calculate a similarity between the first source region image and the first target region image when either the first source region image or the first target region image is not a background image.

By applying the method for obtaining a similarity between images provided in the embodiments of this application, an image is divided into a plurality of regions, and similarity calculation is performed on the regions instead of on the entire image directly. In this way, on one hand, the accuracy of determining the similarity can be ensured as much as possible, and if all the regions are background images, the entire image very probably does not include useful information, and on the other hand, a size of the region is much less than a size of the entire image, even though the time complexity of the template matching method is relatively high, the evaluation can also be completed within a relatively short time.

In some embodiments, the determining module 502 is further configured to calculate a pixel value standard deviation of the second source region image;

determine, when the pixel value standard deviation of the second source region image is less than or equal to a standard deviation threshold, that the second source region image is a background image.

calculate a pixel value standard deviation of the second target region image; and determine, when the pixel value standard deviation of the second target region image is less than or equal to the standard deviation threshold, that the second target region image is a background image.

In this embodiment of this application, a change of an image may be better represented by using a pixel value standard deviation, and a dispersion degree of each pixel in the image is truly reflected, thereby improving the detection accuracy.

In some embodiments, the determining module 502 is further configured to obtain an image matrix through calculation according to the first source region image and the first target region image, the image matrix including a plurality of elements; and determine the similarity between the first source region image and the first target region image according to the image matrix, the similarity between the first source region image and the first target region image being a maximum value of the elements in the image matrix.

By applying the method for calculating a similarity between region images provided in the embodiments of this application, a specific operation manner is provided for implementation of the solution, thereby improving the feasibility and operability of the solution.

In some embodiments, the determining module 502 is further configured to obtain image clarity of the to-be-evaluated image and image clarity of the first associated image, the first associated image pertaining to the pathology image set, and the first associated image being a previous image adjacent to the to-be-evaluated image;

obtain image clarity of a benchmark image when the image clarity of the to-be-evaluated image and the image clarity of the first associated image meet a first preset condition; and determine that the second status is a focusing state when the image clarity of the benchmark image and the image clarity of the to-be-evaluated image meet a second preset condition, the focusing state being in clear state-to-blurred state transition or blurred state-to-clear state transition.

In this embodiment of this application, a problem that the image image clarity is sensitive to changes in external environments can be resolved by using a benchmark image and dual thresholds, so that whether focus of a device is being adjusted can be more reliably inferred.

In some embodiments, the determining module 502 is further configured to after the image clarity of the to-be-evaluated image and the image clarity of the first associated image are obtained, update the benchmark image to the to-be-evaluated image when the image clarity of the to-be-evaluated image and the image clarity of the first associated image do not meet the first preset condition;

update the image clarity of the benchmark image when the image clarity of the benchmark image and the image clarity of the to-be-evaluated image do not meet the second preset condition; and update the benchmark image to the to-be-evaluated image after it is determined that the second status is the focusing state.

In this embodiment of this application, the evaluation is performed by using a benchmark image and two consecutive images, and when a difference between image clarity of a current image and image clarity of the benchmark image is less than a given threshold, a possible case includes that the doctor does not adjust focus, the doctor adjusts the focus by an excessively small amplitude, the microscope jitters, the camera is self-adjusting, or the like. In this case, instead of updating the benchmark image, a image clarity difference of the benchmark image continues to be accumulated, which helps to obtain a more accurate detection result.

In some embodiments, the determining module 502 is further configured to after the image clarity of the to-be-evaluated image and the image clarity of the first associated image are obtained, determine whether a difference between the image clarity of the to-be-evaluated image and the image clarity of the first associated image is greater than or equal to a first image clarity threshold;

determine, when the difference between the image clarity of the to-be-evaluated image and the image clarity of the first associated image is greater than or equal to the first image clarity threshold, that the image clarity of the to-be-evaluated image and the image clarity of the first associated image meet the first preset condition;

determine whether a difference between the image clarity of the benchmark image and the image clarity of the to-be-evaluated image is greater than or equal to a second image clarity threshold when the difference between the image clarity of the to-be-evaluated image and the image clarity of the first associated image is less than the first image clarity threshold, the second image clarity threshold being greater than the first image clarity threshold; and determine, when the difference between the image clarity of the benchmark image and the image clarity of the to-be-evaluated image is greater than or equal to the second image clarity threshold, that the image clarity of the benchmark image and the image clarity of the to-be-evaluated image meet the second preset condition.

In this embodiment of this application, a low threshold is used when image clarity of a current image and image clarity of a previous image are compared, and a high threshold is used when the image clarity of the current image and image clarity of a benchmark image are compared. When the low threshold is used, it may be inferred that the doctor does not adjust focus of the microscope, and when the high threshold is used, it is inferred that the doctor is adjusting the focus of the microscope, thereby improving the reliability of image clarity detection.

Figure 15:
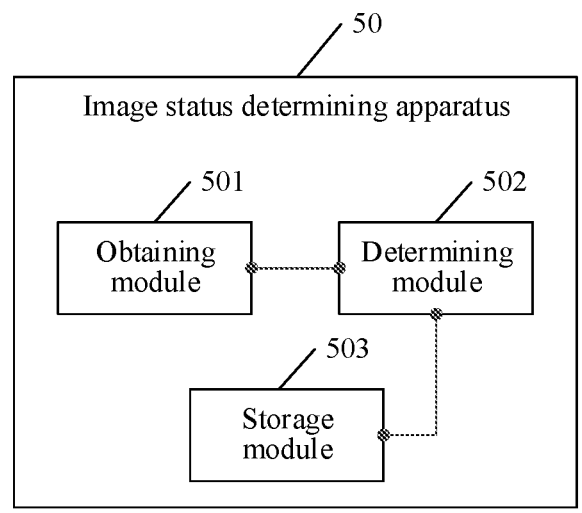
FIG. 15 is a schematic diagram of a composition structure of an image status determining apparatus according to an embodiment of this application.

In some embodiments, FIG. 15 is a schematic diagram of a composition structure of an image status determining apparatus 50 according to an embodiment of this application. Referring to FIG. 15, based on FIG. 14, the image status determining apparatus 50 further includes a storage module 503.

The storage module 503 is configured to after the determining module 502 determines a second status corresponding to the to-be-evaluated image according to the pathology image set, store the to-be-evaluated image when the first status is of moving state-to-static state transition; and store the to-be-evaluated image when the second status is of blurred state-to-clear state transition.

In this embodiment of this application, a pathology image acquired by a smart microscope may be automatically stored, and the pathology image is used for subsequent pathology report, communication, backup, and the like. Based on the task of automatically storing an image, a pathology image set is screened, and because an image in another state is redundant or of a low quality, only an image in moving state-to-static state transition and an image in blurred state-to-clear state transition need to be stored. In the foregoing manner, on one hand, there is no need for medical staff to manually acquire images, which improves the work efficiency, and on the other hand, a storage space occupied by the images is reduced.

Figure 16:
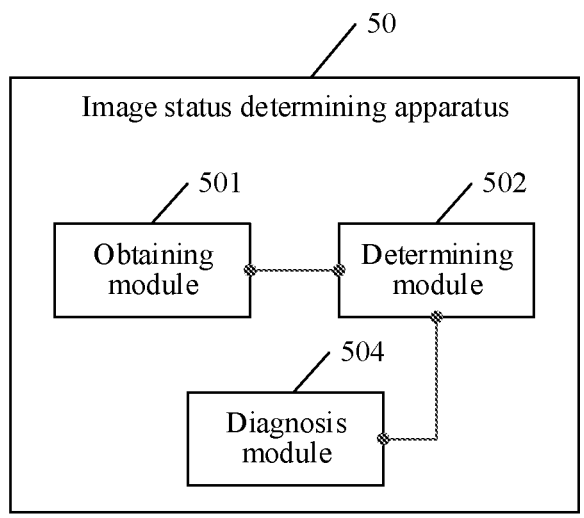
FIG. 16 is a schematic diagram of a composition structure of an image status determining apparatus according to an embodiment of this application.

In some embodiments, FIG. 16 is a schematic diagram of a composition structure of an image status determining apparatus 50 according to an embodiment of this application. Referring to FIG. 16, based on FIG. 14, the image status determining apparatus 50 further includes a diagnosis module 504.

The diagnosis module 504 is configured to after the determining module 502 determines a second status corresponding to the to-be-evaluated image according to the pathology image set, perform pathological analysis on the to-be-evaluated image when the first status is of moving state-to-static state transition; and perform pathological analysis on the to-be-evaluated image when the second status is of blurred state-to-clear state transition.

In this embodiment of this application, real-time AI auxiliary diagnosis based on an image refers to transmitting images acquired by using a camera to an AI auxiliary diagnosis module in real time when the doctor uses a pathological microscope, and feeding back an AI auxiliary diagnosis result to the doctor, thereby improving the work efficiency of the doctor. In this application, the images transmitted to the A1 auxiliary diagnosis module may be screened, and only an image in moving state-to-static state transition and an image in blurred state-to-clear state transition are selected. This is because the images in the two states are what the doctor needs to observe carefully and is really interested in, thereby greatly reducing a throughput pressure of the AI auxiliary diagnosis module.

Figure 17:
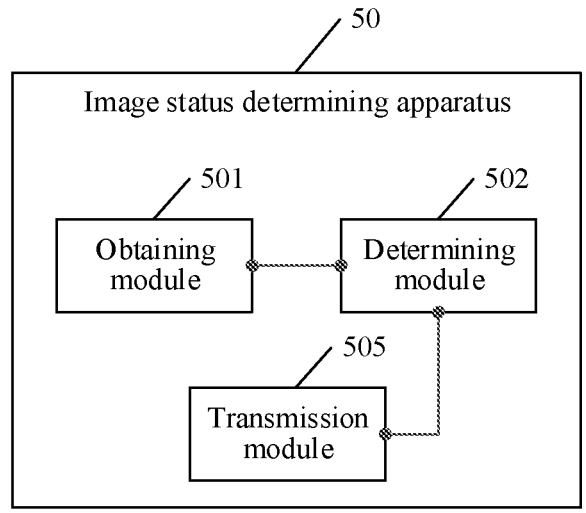
FIG. 17 is a schematic diagram of a composition structure of an image status determining apparatus according to an embodiment of this application.

In some embodiments, FIG. 17 is a schematic diagram of a composition structure of an image status determining apparatus 50 according to an embodiment of this application. Referring to FIG. 17, based on FIG. 14, the image status determining apparatus 50 further includes a transmission module 505.

The transmission module 505 is configured to after the determining module 502 determines a second status corresponding to the to-be-evaluated image according to the pathology image set, transmit the to-be-evaluated image when the first status is of moving state-to-static state transition, or the first status is of static state-to-moving state transition, or the first status is the moving state; and transmit the to-be-evaluated image when the second status is of blurred state-to-clear state transition or the second status is of clear state-to-blurred state transition.

In this embodiment of this application, during hospital consultation or communication, a doctor operating a microscope needs to remotely share a field of view of the microscope to other doctors for observing. In this case, pathology images continuously acquired by using a camera of the microscope need to be transmitted to the other party in real time over a network. In this way, the pathology images may be screened before being transmitted over the network, and a pathology image in a static state is excluded because the pathology image of this state is redundant, thereby reducing the amount of data required to be transmitted over the network.

Figure 18:
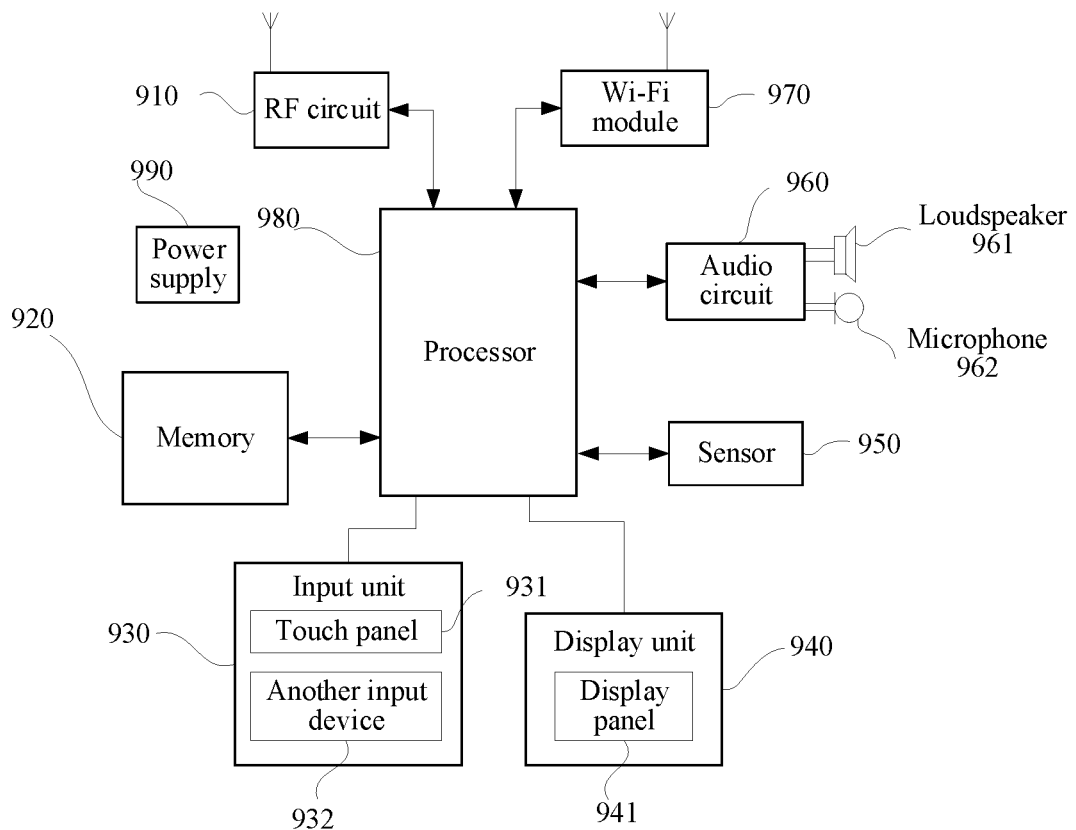
FIG. 18 is a schematic diagram of a composition structure of a terminal device according to an embodiment of this application.

During actual implementation, the image status determining apparatus provided in the embodiments of this application may be implemented by a terminal device. FIG. 18 is a schematic diagram of a composition structure of a terminal device according to an embodiment of this application. As shown in FIG. 18, for ease of description, only parts related to the embodiments of this application are shown. For specific technical details that are not disclosed, refer to the method part of the embodiments of this application. The terminal device may be any terminal device including a mobile phone, a tablet computer, a personal digital assistant (PDA), a point of sales (POS), an on-board computer, or the like, and the terminal device being a mobile phone is used as an example.

FIG. 18 is a block diagram of the structure of a part of a mobile phone related to a terminal device according to an embodiment of this application. Referring to FIG. 18, the mobile phone includes components such as: a radio frequency (RF) circuit 910, a memory 920, an input unit 930, a display unit 940, a sensor 950, an audio circuit 960, a wireless fidelity (Wi-Fi) module 970, a processor 980, and a power supply 990. A person skilled in the art may understand that the structure of the mobile phone shown in FIG. 18 does not constitute any limitation on the mobile phone, and instead, the mobile phone may include components more or fewer than those shown in the figure, or combine some components, or have a different component arrangement.

The following makes a specific description of the components of the mobile phone with reference to FIG. 18.

The RF circuit 910 may be configured to receive and transmit signals in an information receiving and transmitting process or a call process. Specifically, the RF circuit receives downlink information from a base station, then delivers the downlink information to the processor 980 for processing, and transmits designed uplink data to the base station. Generally, the RF circuit 910 includes, but is not limited to, an antenna, at least one amplifier, a transceiver, a coupler, a low noise amplifier (LNA), and a duplexer. In addition, the RF circuit 910 may also communicate with a network and another device through wireless communication. The wireless communication may use any communication standard or protocol, including but not limited to global system for mobile communication (GSM), general packet radio service (GPRS), code division multiple access (CDMA), wideband code division multiple access (WCDMA), long term evolution (LTE), email, short messaging service (SMS), and the like.

The memory 920 may be configured to store a software program and module. The processor 980 runs the software program and module stored in the memory 920, to implement various functional applications and data processing of the mobile phone. The memory 920 may mainly include a program storage area and a data storage area, where the program storage area may store an operating system, an application program required by at least one function (for example, a sound playback function and an image display function), and the like; and the data storage area may store data (for example, audio data and a phone book) created according to use of the mobile phone, and the like. In addition, the memory 920 may include a high-speed random access memory, and may further include a nonvolatile memory, such as at least one magnetic disk storage device, a flash memory device, or another volatile solid-state storage device.

In some embodiments, the processor 920 is further configured to store a computer program, the computer program being configured to perform the pathology image-based image status determining method provided in the embodiments of this application.

The input unit 930 may be configured to receive input digit or character information, and generate a key signal input related to the user setting and function control of the mobile phone. During actual implementation, the input unit 930 may include a touch panel 931 and another input device 932. The touch panel 931 may also be referred to as a touch screen, and may collect a touch operation of a user on or near the touch panel (such as an operation of a user on or near the touch panel 931 by using any suitable object or attachment, such as a finger or a touch pen), and drive a corresponding connection apparatus according to a preset program. In some embodiments, the touch panel 931 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 980. Moreover, the touch controller can receive and execute a command transmitted from the processor 980. In addition, the touch panel 931 may be implemented by using various types, such as a resistive type, a capacitive type, an infrared type, and a surface acoustic wave type. In addition to the touch panel 931, the input unit 930 may further include the another input device 932. During actual implementation, the another input device 932 may include, but not limited to, one or more of a physical keyboard, a functional key (for example, a volume control key or a switch key), a track ball, a mouse, and a joystick.

The display unit 940 may be configured to display information input by the user or information provided for the user, and various menus of the mobile phone. The display unit 940 may include a display panel 941. In some embodiments, the display panel 941 may be configured in the form of a liquid crystal display (LCD), an organic light-emitting diode (OLED), or the like. Further, the touch panel 931 may cover the display panel 941. After detecting a touch operation on or near the touch panel, the touch panel 931 transfers the touch operation to the processor 980, to determine a type of a touch event. Then, the processor 980 provides a corresponding visual output on the display panel 941 according to the type of the touch event. Although in FIG. 18, the touch panel 931 and the display panel 941 are used as two separate parts to implement input and output functions of the mobile phone, in some embodiments, the touch panel 931 and the display panel 941 may be integrated to implement the input and output functions of the mobile phone.

The mobile phone may further include at least one sensor 950 such as an optical sensor, a motion sensor, and other sensors. During actual implementation, the optical sensor may include an ambient light sensor and a proximity sensor. The ambient light sensor may adjust luminance of the display panel 941 according to brightness of the ambient light. The proximity sensor may switch off the display panel 941 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, may be configured in the mobile phone. Details are not described herein again.

The audio circuit 960, a speaker 961, and a microphone 962 may provide audio interfaces between the user and the mobile phone. The audio circuit 960 may convert received audio data into an electrical signal and transmit the electrical signal to the speaker 961. The speaker 961 converts the electrical signal into a sound signal for output. On the other hand, the microphone 962 converts a collected sound signal into an electrical signal. The audio circuit 960 receives the electrical signal, converts the electrical signal into audio data, and outputs the audio data to the processor 980 for processing. Then, the processor transmits the audio data to, for example, another mobile phone by using the RF circuit 910, or outputs the audio data to the memory 920 for further processing.

Wi-Fi is a short distance wireless transmission technology. The mobile phone may help, by using the Wi-Fi module 970, a user to receive and transmit an email, browse a web page, access stream media, and the like. This provides wireless broadband Internet access for the user. Although FIG. 18 shows the Wi-Fi module 970, it may be understood that the Wi-Fi module is not a necessary component of the mobile phone, and the Wi-Fi module may be omitted as required provided that the scope of the essence of the present disclosure is not changed.

The processor 980 is the control center of the mobile phone, and is connected to various parts of the mobile phone by using various interfaces and lines. By running or executing the software program and/or module stored in the memory 920, and invoking data stored in the memory 920, the processor performs various functions and data processing of the mobile phone, thereby performing overall monitoring on the mobile phone. In some embodiments, the processor 980 may include one or more processing units. In some embodiments, the processor 980 may integrate an application processor and a modem processor. The application processor mainly processes an operating system, a user interface, an application program, and the like. The modem processor mainly processes wireless communication. It may be understood that the foregoing modem processor may either not be integrated into the processor 980.

The mobile phone further includes the power supply 990 (such as a battery) for supplying power to the components. In some embodiments, the power supply may be logically connected to the processor 980 by using a power management system, thereby implementing functions such as charging, discharging and power consumption management by using the power management system. Although not shown in the figure, the mobile phone may further include a camera, a Bluetooth module, and the like, which are not further described herein.

In this embodiment of this application, the processor 980 included in the terminal device is further configured to execute a computer program stored in the memory 920, to implement the pathology image-based image status determining method provided in the embodiments of this application.

A person skilled in the art can clearly understand that for convenience and conciseness of description, for specific working processes of the foregoing described system, apparatus and unit, refer to the corresponding processes in the foregoing method embodiments, and details are not described herein again.

In the several embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a non-transitory computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc. The foregoing embodiments are merely intended for describing the technical solutions of this application, but not for limiting this application. Although this application is described in detail with reference to the foregoing embodiments, a person of ordinary skill in the art understand that they may still make modifications to the technical solutions described in the foregoing embodiments or make equivalent replacements to some technical features thereof, without departing from the spirit and scope of the technical solutions of the embodiments of this application.

INDUSTRIAL PRACTICABILITY

In the embodiments of this application, a pathology image set is obtained by a microscope, the pathology image set including at least a to-be-evaluated image and associated images, the associated images and the to-be-evaluated image being consecutive frame images, then a first status corresponding to the to-be-evaluated image is determined according to the pathology image set, the first status being used for indicating a motion change of the to-be-evaluated image, and a second status corresponding to the to-be-evaluated image is determined according to the pathology image set when the first status is a static state, the second status being used for indicating a change in image clarity of the to-be-evaluated image. In this way, moving state evaluation and image clarity state evaluation can be performed on acquired images, to determine image statuses of different images, and an image status of a pathology image often reflects an operation of a user on a microscope and a change in a field of view of an image in the microscope, so that pathology images acquired by a camera of the microscope can be screened according to image statuses and a task type, to assist in completing a task purpose, thereby reducing the difficulty in image processing and improving the efficiency of task processing.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs image acquisition and/or image processing. In practical application, the foregoing functions may be allocated to and completed by different functional modules according to requirements, that is, an inner structure of a device is divided into different functional modules to implement all or a part of the functions described above.

What is claimed is:

1. A method, comprising:
    acquiring a pathology image set using a microscope, the pathology image set including at least a to-be-evaluated image and one or more associated images, wherein the to-be-evaluated image and the one or more associated images are consecutive frames of images acquired using the microscope and the one or more associated images include a first associated image that is acquired before the to-be-evaluated image;
    determining a first status corresponding to the to-be-evaluated image according to the pathology image set, the first status being used for indicating a motion change of the to-be-evaluated image during the acquisition and the first status includes a plurality of pre-defined states; and
    in accordance with a determination that the first status corresponds to a static state of the plurality of pre-defined states, determining a second status corresponding to the to-be-evaluated image according to the pathology image set, wherein the second status indicates a change in image clarity of the to-be-evaluated image, wherein the determining the second status further comprises:
    obtaining an image clarity of the to-be-evaluated image and an image clarity of the first associated image;
    in accordance with a determination that the image clarities of the to-be-evaluated image and the first associated image meet a first preset condition, obtaining an image clarity of a benchmark image; and
    in accordance with a determination that the image clarities of the benchmark image and the to-be-evaluated image meet a second preset condition, determining that the second status is a focusing state, the focusing state including a first change in focus from clear to blurred or a second change in focus from blurred to clear.

2. The method according to claim 1, wherein:
the one or more associated images comprise a first associated image and a second associated image that is consecutive to the first associated image, the first associated image is acquired before the to-be-evaluated image and the second associated image is acquired before the first associated image; and
determining the first status further comprises:
  obtaining a first similarity between the to-be-evaluated image and the first associated image;
  in accordance with a determination that the first similarity is greater than a similarity threshold, obtaining a second similarity between the first associated image and the second associated image;
  in accordance with a determination that the second similarity is greater than the similarity threshold, determining that the first status is the static state; and
  in accordance with a determination that the second similarity is less than or equal to the similarity threshold, determining that the first status is a moving state to static state transition.

3. The method according to claim 1, wherein the one or more associated images include a first associated image and a second associated image that is consecutive to the first associated image, the first associated image is acquired before the to-be-evaluated image and the second associated image is acquired before the first associated image; and
determining the first status further comprises:
  obtaining a first similarity between the to-be-evaluated image and the first associated image;
  in accordance with a determination that the first similarity is less than or equal to a similarity threshold, obtaining a second similarity between the first associated image and the second associated image;
  in accordance with a determination that the second similarity is greater than the similarity threshold, determining that the first status is a transition state from the static state to a moving state; and
  in accordance with a determination that the second similarity is less than or equal to the similarity threshold, determining that the first status is the moving state.

4. The method according to claim 2, wherein obtaining the first similarity comprises:
  determining a source region pathology image set according to the to-be-evaluated image, the source region pathology image set comprising M source region images, wherein M is an integer greater than 1;
  determining a target region pathology image set according to the first associated image, the target region pathology image set comprising M target region images and the M target region images have image sizes that are less than image sizes of the source region images;
  extracting a first source region image from the source region pathology image set;
  extracting a first target region image from the target region pathology image set;
  in accordance with a determination that the first source region image and the first target region image are background images:
    extracting a second source region image from the source region pathology image set;
    extracting a second target region image from the target region pathology image set; and
    detecting whether the second source region image and the second target region image are background images; and
  in accordance with a determination that at least one of the first source region image and the first target region image is not a background image:
    calculating a similarity between the first source region image and the first target region image; and
    using the calculated similarity as the similarity between the to-be-evaluated image and the first associated image.

5. The method according to claim 4, wherein detecting whether the second source region image and the second target region image are background images further comprises:
  calculating a pixel value standard deviation of the second source region image;
  determining, when the pixel value standard deviation of the second source region image is less than or equal to a standard deviation threshold, that the second source region image is a background image;
  calculating a pixel value standard deviation of the second target region image; and
  determining, when the pixel value standard deviation of the second target region image is less than or equal to the standard deviation threshold, that the second target region image is a background image.

6. The method according to claim 4, wherein calculating the similarity between the first source region image and the first target region image further comprises:
  obtaining an image matrix through calculation according to the first source region image and the first target region image, the image matrix comprising a plurality of elements; and
  determining the similarity between the first source region image and the first target region image according to the image matrix, the similarity between the first source region image and the first target region image being a maximum value of the elements in the image matrix.

7. The method according to claim 1, further comprising:
after obtaining the image clarities of the to-be-evaluated image and the first associated image:
  in accordance with a determination that the image clarities of the to-be-evaluated image and the image clarity of the first associated image do not meet the first preset condition, updating the benchmark image to the to-be-evaluated image; and
  in accordance with a determination that the image clarities of the benchmark image and the image clarity of the to-be-evaluated image do not meet the second preset condition, updating the image clarity of the benchmark image when the image clarity of the benchmark image and the image clarity of the to-be-evaluated image do not meet the second preset condition; and
after the determining that the second status is a focusing state, the method further comprises:
updating the benchmark image for the to-be-evaluated image.

8. The method according to claim 1, further comprising:
after obtaining the image clarities of the to-be-evaluated image and the first associated image:
  determining whether a difference between the image clarity of the to-be-evaluated image and the image clarity of the first associated image is greater than or equal to a first image clarity threshold;
  determining, when the difference between the image clarity of the to-be-evaluated image and the image clarity of the first associated image is greater than or equal to the first image clarity threshold, that the image clarity of the to-be-evaluated image and the image clarity of the first associated image meet the first preset condition;

determining whether a difference between the image clarity of the benchmark image and the image clarity of the to-be-evaluated image is greater than or equal to a second image clarity threshold when the difference between the image clarity of the to-be-evaluated image and the image clarity of the first associated image is less than the first image clarity threshold, the second image clarity threshold being greater than the first image clarity threshold; and determining, when the difference between the image clarity of the benchmark image and the image clarity of the to-be-evaluated image is greater than or equal to the second image clarity threshold, that the image clarity of the benchmark image and the image clarity of the to-be-evaluated image meet the second preset condition.

9. The method according to claim 1, further comprising:
after determining the first status:
storing the to-be-evaluated image when the first status corresponds to a first transition state from a moving state to the static state; and
after determining the second status, storing the to-be-evaluated image when the second status is a focusing state that includes a change from blurred to clear.

10. The method according to claim 1, further comprising:
after determining the first status:
performing pathological analysis on the to-be-evaluated image when the first status is of a transition state from a moving state to the static state; and
after determining the second status, performing pathological analysis on the to-be-evaluated image when the second status is a focusing state that includes a change from blurred to clear.

11. The method according to claim 1, further comprising:
after determining the first status:
transmitting the to-be-evaluated image when the first status is: (1) a first transition state from a moving state to the static state, (2) a second transition state from the static state to the moving state, or (3) the moving state; and
after determining the second status, transmitting the to-be-evaluated image when the second status is a focusing state that includes a change from blurred to clear or includes a change from clear to blurred.

12. A computer device, comprising:
one or more processors; and
memory storing one or more programs, that, when executed by the one or more processors, cause the one or more processors to perform operations comprising:
acquiring a pathology image set using a microscope, the pathology image set including at least a to-be-evaluated image and one or more associated images, wherein the to-be-evaluated image and the one or more associated images are consecutive frames of images acquired using the microscope and the one or more associated images include a first associated image that is acquired before the to-be-evaluated image;
determining a first status corresponding to the to-be-evaluated image according to the pathology image set, the first status being used for indicating a motion change of the to-be-evaluated image during the acquisition and the first status includes a plurality of predefined states; and
in accordance with a determination that the first status corresponds to a static state of the plurality of predefined states, determining a second status corresponding to the to-be-evaluated image according to the pathology image set, wherein the second status indicates a change in image clarity of the to-be-evaluated image, wherein the determining the second status further comprises:
obtaining an image clarity of the to-be-evaluated image and an image clarity of the first associated image;
in accordance with a determination that the image clarities of the to-be-evaluated image and the first associated image meet a first preset condition, obtaining an image clarity of a benchmark image; and
in accordance with a determination that the image clarities of the benchmark image and the to-be-evaluated image meet a second preset condition, determining that the second status is a focusing state, the focusing state including a first change in focus from clear to blurred or a second change in focus from blurred to clear.

13. The computer device according to claim 12, wherein:
the one or more associated images comprise a first associated image and a second associated image that is consecutive to the first associated image, the first associated image is acquired before the to-be-evaluated image and the second associated image is acquired before the first associated image; and
determining the first status further comprises:
obtaining a first similarity between the to-be-evaluated image and the first associated image;
in accordance with a determination that the first similarity is greater than a similarity threshold, obtaining a second similarity between the first associated image and the second associated image;
in accordance with a determination that the second similarity is greater than the similarity threshold, determining that the first status is the static state; and
in accordance with a determination that the second similarity is less than or equal to the similarity threshold, determining that the first status is a moving state to static state transition.

14. The computer device according to claim 13, wherein obtaining the first similarity comprises:
determining a source region pathology image set according to the to-be-evaluated image, the source region pathology image set comprising M source region images, wherein M is an integer greater than 1;
determining a target region pathology image set according to the first associated image, the target region pathology image set comprising M target region images and the M target region images have image sizes that are less than image sizes of the source region images;
extracting a first source region image from the source region pathology image set;
extracting a first target region image from the target region pathology image set;
in accordance with a determination that the first source region image and the first target region image are background images:
extracting a second source region image from the source region pathology image set;

extracting a second target region image from the target region pathology image set; and detecting whether the second source region image and the second target region image are background images; and in accordance with a determination that at least one of the first source region image and the first target region image is not a background image:

calculating a similarity between the first source region image and the first target region image; and using the calculated similarity as the similarity between the to-be-evaluated image and the first associated image.

15. The computer device according to claim 12, wherein the one or more associated images include a first associated image and a second associated image that is consecutive to the first associated image, the first associated image is acquired before the to-be-evaluated image and the second associated image is acquired before the first associated image; and determining the first status further comprises:

obtaining a first similarity between the to-be-evaluated image and the first associated image;

in accordance with a determination that the first similarity is less than or equal to a similarity threshold, obtaining a second similarity between the first associated image and the second associated image;

in accordance with a determination that the second similarity is greater than the similarity threshold, determining that the first status is a transition state from the static state to a moving state; and in accordance with a determination that the second similarity is less than or equal to the similarity threshold, determining that the first status is the moving state.

16. The computer device according to claim 15, wherein detecting whether the second source region image and the second target region image are background images further comprises:

calculating a pixel value standard deviation of the second source region image;

determining, when the pixel value standard deviation of the second source region image is less than or equal to a standard deviation threshold, that the second source region image is a background image;

calculating a pixel value standard deviation of the second target region image; and determining, when the pixel value standard deviation of the second target region image is less than or equal to the standard deviation threshold, that the second target region image is a background image.

17. A non-transitory computer readable storage medium storing instructions that, when executed by one or more processors of a computer device, cause the one or more processors to perform operations comprising:

acquiring a pathology image set using a microscope, the pathology image set including at least a to-be-evaluated image and one or more associated images, wherein the to-be-evaluated image and the one or more associated images are consecutive frames of images acquired using the microscope and the one or more associated images include a first associated image that is acquired before the to-be-evaluated image;

determining a first status corresponding to the to-be-evaluated image according to the pathology image set, the first status being used for indicating a motion change of the to-be-evaluated image during the acquisition and the first status includes a plurality of predefined states; and in accordance with a determination that the first status corresponds to a static state of the plurality of predefined states, determining a second status corresponding to the to-be-evaluated image according to the pathology image set, wherein the second status indicates a change in image clarity of the to-be-evaluated image, wherein the determining the second status further comprises:

obtaining an image clarity of the to-be-evaluated image and an image clarity of the first associated image;

in accordance with a determination that the image clarities of the to-be-evaluated image and the first associated image meet a first preset condition, obtaining an image clarity of a benchmark image; and in accordance with a determination that the image clarities of the benchmark image and the to-be-evaluated image meet a second preset condition, determining that the second status is a focusing state, the focusing state including a first change in focus from clear to blurred or a second change in focus from blurred to clear.

18. The non-transitory computer readable storage medium according to claim 17, wherein:

the one or more associated images comprise a first associated image and a second associated image that is consecutive to the first associated image, the first associated image is acquired before the to-be-evaluated image and the second associated image is acquired before the first associated image; and determining the first status further comprises:

obtaining a first similarity between the to-be-evaluated image and the first associated image;

in accordance with a determination that the first similarity is greater than a similarity threshold, obtaining a second similarity between the first associated image and the second associated image;

in accordance with a determination that the second similarity is greater than the similarity threshold, determining that the first status is the static state; and in accordance with a determination that the second similarity is less than or equal to the similarity threshold, determining that the first status is a moving state-to-static state transition.

19. The non-transitory computer readable storage medium according to claim 18, wherein obtaining the first similarity comprises:

determining a source region pathology image set according to the to-be-evaluated image, the source region pathology image set comprising M source region images, wherein M is an integer greater than 1;

determining a target region pathology image set according to the first associated image, the target region pathology image set comprising M target region images and the M target region images have image sizes that are less than image sizes of the source region images;

extracting a first source region image from the source region pathology image set;

extracting a first target region image from the target region pathology image set;

in accordance with a determination that the first source region image and the first target region image are background images:

extracting a second source region image from the source region pathology image set;
extracting a second target region image from the target region pathology image set; and
detecting whether the second source region image and the second target region image are background images; and in accordance with a determination that at least one of the first source region image and the first target region image is not a background image:
calculating a similarity between the first source region image and the first target region image; and
using the calculated similarity as the similarity between the to-be-evaluated image and the first associated image.

* * * * *